US012566266B2

(12) United States Patent
Kobayashi et al.

(10) Patent No.: US 12,566,266 B2
(45) Date of Patent: Mar. 3, 2026

(54) LIGHTING DEVICE AND DISTANCE MEASUREMENT APPARATUS

(71) Applicant: Sony Semiconductor Solutions Corporation, Kanagawa (JP)

(72) Inventors: Takashi Kobayashi, Kanagawa (JP);
Motoi Kimura, Kanagawa (JP);
Tatsuya Oiwa, Kanagawa (JP); Jialun Xu, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 976 days.

(21) Appl. No.: 17/760,882

(22) PCT Filed: Oct. 8, 2020

(86) PCT No.: PCT/JP2020/038090
§ 371 (c)(1),
(2) Date: Mar. 16, 2022

(87) PCT Pub. No.: WO2021/075340
PCT Pub. Date: Apr. 22, 2021

(65) Prior Publication Data
US 2022/0342070 A1 Oct. 27, 2022

(30) Foreign Application Priority Data

Oct. 15, 2019 (JP) ................................. 2019-188724

(51) Int. Cl.
*G01S 17/08* (2006.01)
*G01S 7/481* (2006.01)
(Continued)

(52) U.S. Cl.
CPC .............. *G01S 17/08* (2013.01); *G01S 7/481* (2013.01); *G01S 7/4814* (2013.01); *G02B 27/0905* (2013.01); *G01S 17/89* (2013.01)

(58) Field of Classification Search
CPC .... G01S 7/4813; G01S 7/4814; G01S 17/894; G01S 7/4815; G01S 17/08; G01S 17/10;
(Continued)

(56) References Cited

U.S. PATENT DOCUMENTS

2009/0185274 A1 7/2009 Shpunt
2013/0266326 A1 10/2013 Joseph et al.
(Continued)

FOREIGN PATENT DOCUMENTS

CN 108169981 A 6/2018
CN 108828563 A * 11/2018 ............. G01S 7/484
(Continued)

OTHER PUBLICATIONS

CN-110412544-A (Year: 2019).*
(Continued)

*Primary Examiner* — Sanjiv D. Patel
(74) *Attorney, Agent, or Firm* — K&L Gates LLP

(57) ABSTRACT

A lighting device includes: a light-emitting element having multiple first light-emitting sections and multiple second light-emitting sections; a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light; and a second optical member that shapes beam shapes of the multiple pieces of first light, beam shapes of the multiple pieces of second light, or both the beam shapes of the multiple pieces of first light and the multiple pieces of second light, and outputs the multiple pieces of first light and the multiple pieces of second light in a manner that the beam shapes are different between the multiple pieces of first light and the multiple pieces of second light.

20 Claims, 22 Drawing Sheets

(51) Int. Cl.
    *G02B 27/09*        (2006.01)
    *G01S 17/89*        (2020.01)

(58) Field of Classification Search
    CPC .......... G01S 7/484; G01S 17/86; G01S 17/42;
                   H01S 5/026; H01S 5/4012; H01S 5/183;
               H01S 5/04256; H01S 5/423; H01S 5/005;
                 H01S 5/18394; G02F 1/294; G02B 3/14
    See application file for complete search history.

(56) References Cited

U.S. PATENT DOCUMENTS

| | | | |
|---|---|---|---|
| 2014/0376092 | A1 | 12/2014 | Mor |
| 2018/0301874 | A1* | 10/2018 | Burroughs ................ H01S 5/12 |
| 2019/0033429 | A1* | 1/2019 | Donovan .............. G01S 7/4815 |
| 2019/0097397 | A1* | 3/2019 | Yuen ................... H01S 5/02461 |
| 2019/0195991 | A1* | 6/2019 | Miki ..................... G01S 17/931 |
| 2019/0258134 | A1* | 8/2019 | Chen .................. G01B 11/2513 |
| 2019/0273906 | A1 | 9/2019 | Xiao |
| 2020/0194973 | A1* | 6/2020 | Bloemen ............ H01S 5/18388 |

FOREIGN PATENT DOCUMENTS

| | | | | | |
|---|---|---|---|---|---|
| CN | 109901353 | A | | 6/2019 | |
| CN | 110412544 | A | * | 11/2019 | ............ G01S 17/08 |
| JP | 2008294322 | A | | 12/2008 | |
| JP | 2011-510344 | A | | 3/2011 | |
| JP | 2014521227 | A | | 8/2014 | |
| JP | 2016-519436 | A | | 6/2016 | |
| JP | 2017-102319 | A | | 6/2017 | |
| JP | 2018511785 | A | | 4/2018 | |
| JP | 2019-113530 | A | | 7/2019 | |

OTHER PUBLICATIONS

CN-108828563-A (Year: 2018).*
International Search Report issued in International Patent Application No. PCT/JP2020/038090 on Dec. 8, 2020 and English translation of same. 5 pages.
Written Opinion issued in International Patent Application No. PCT/JP2020/038090 on Dec. 8, 2020. 5 pages.

\* cited by examiner

[ FIG. 1 ]
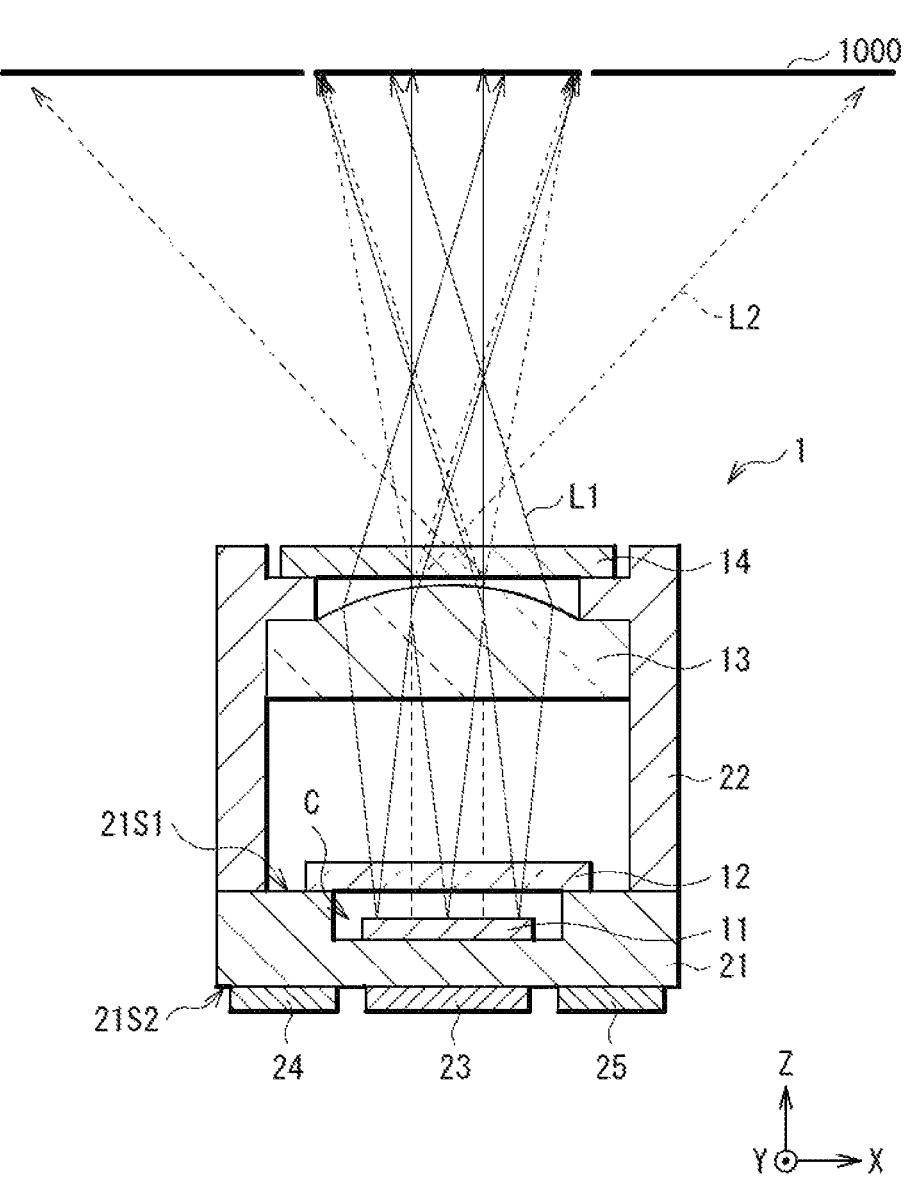

[ FIG. 2 ]
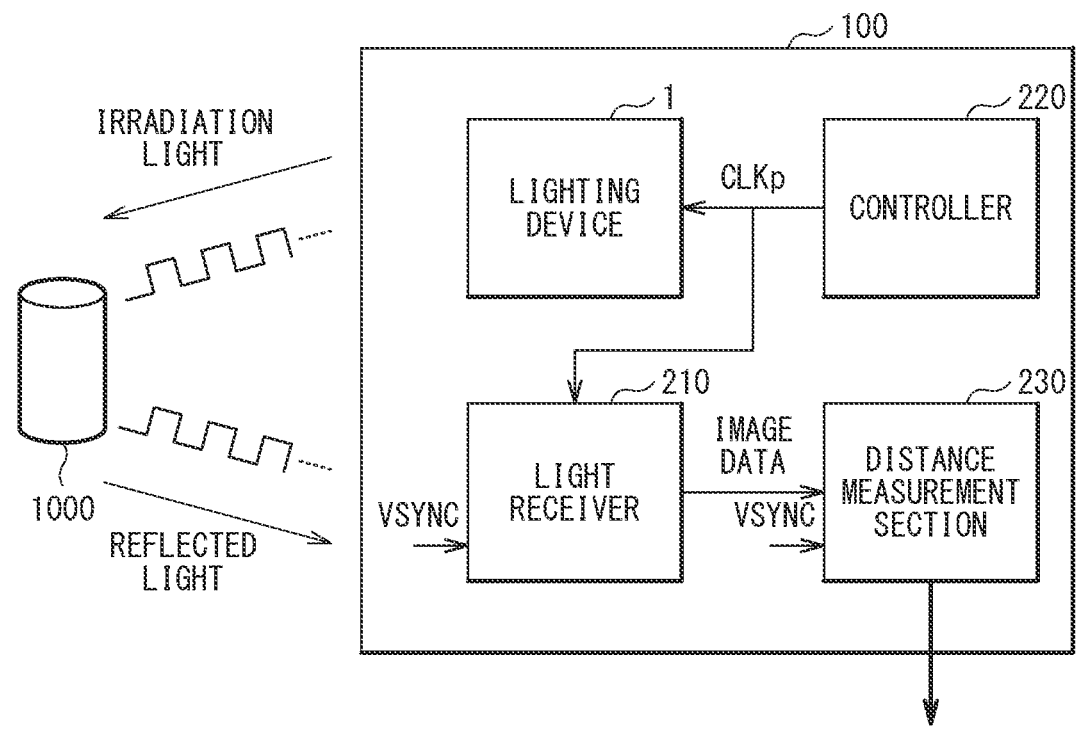
[ FIG. 3 ]
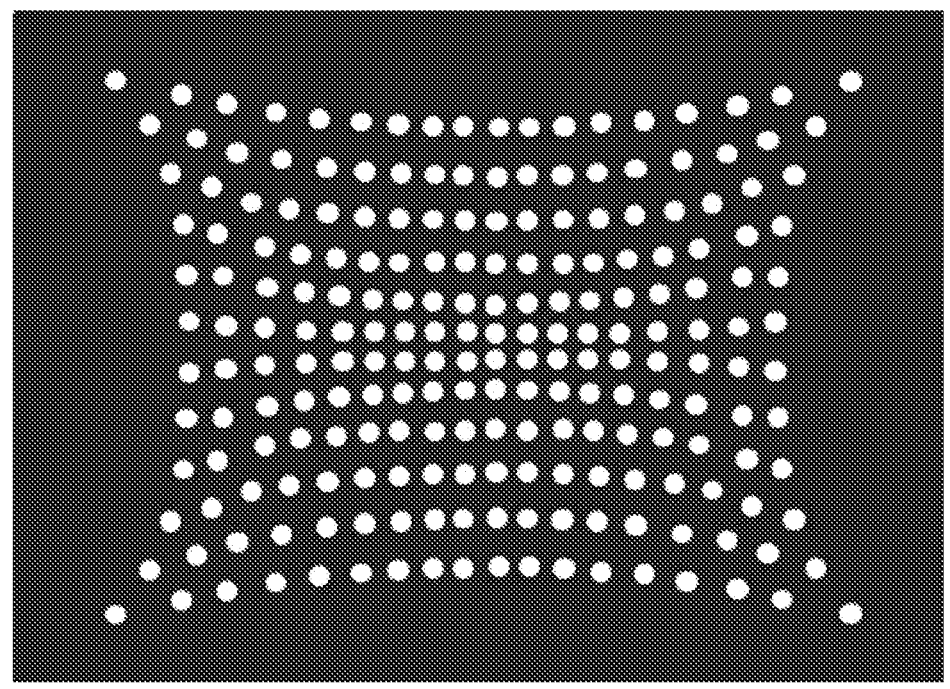

[ FIG. 4 ]
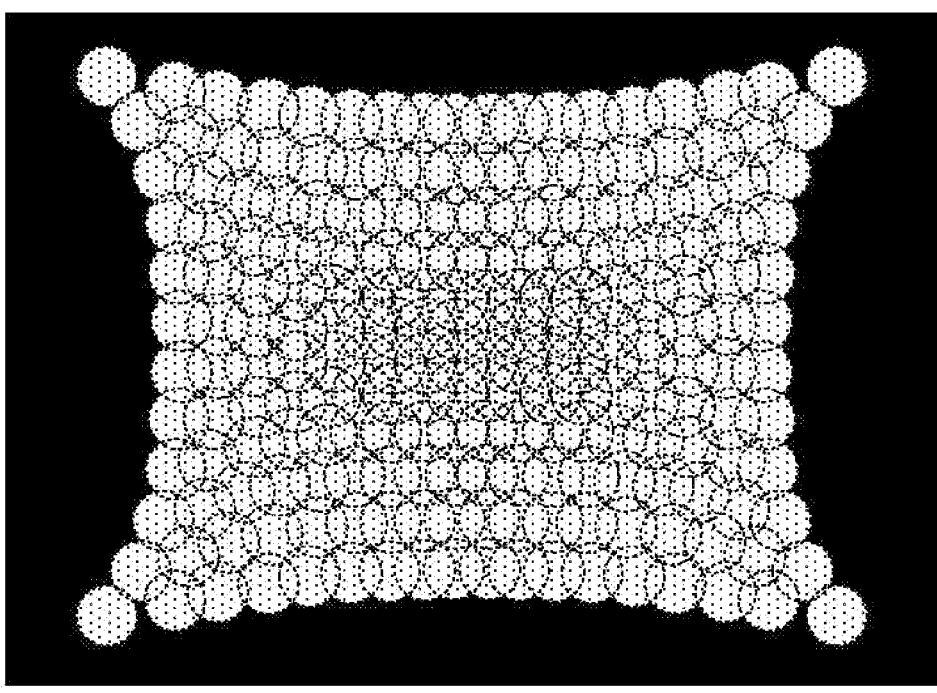
[ FIG. 5 ]
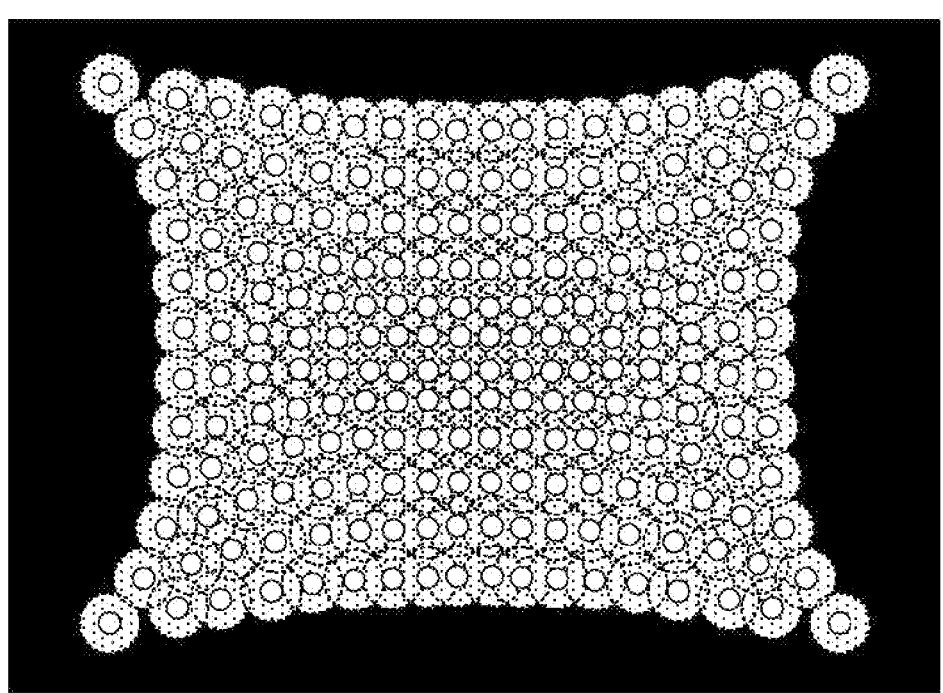

[ FIG. 6 ]
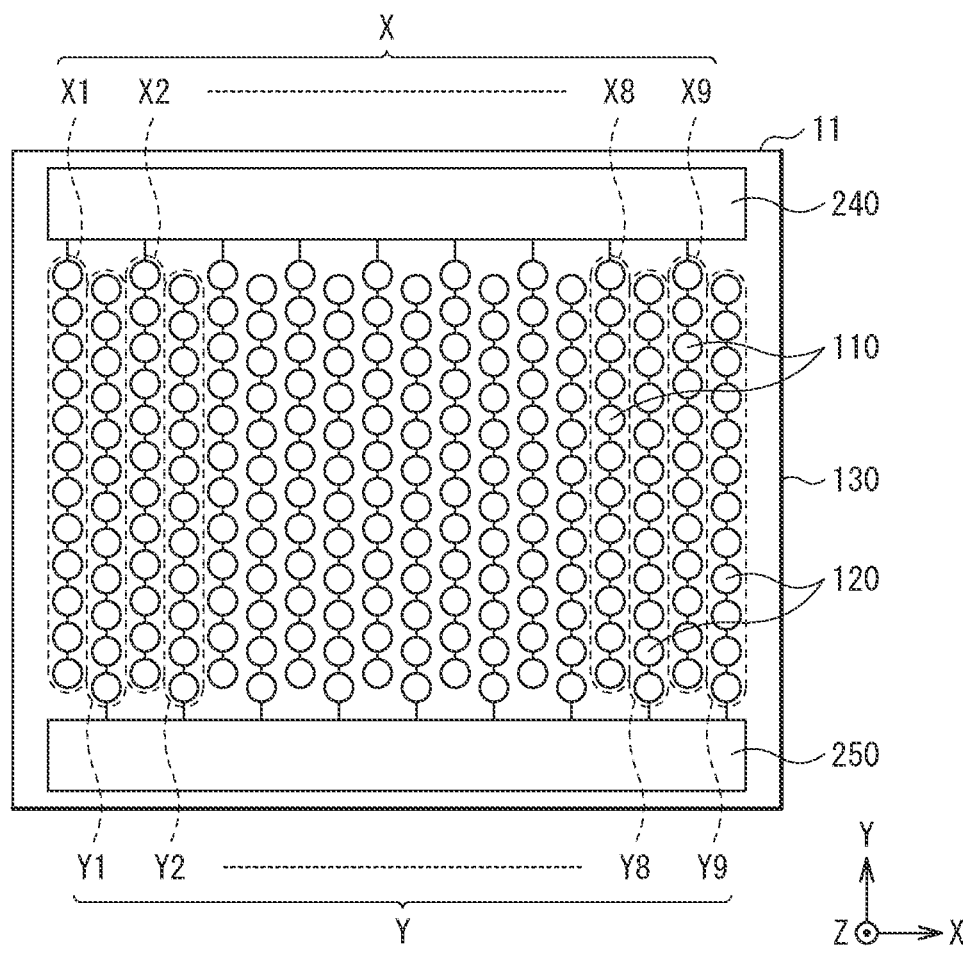
[ FIG. 7 ]
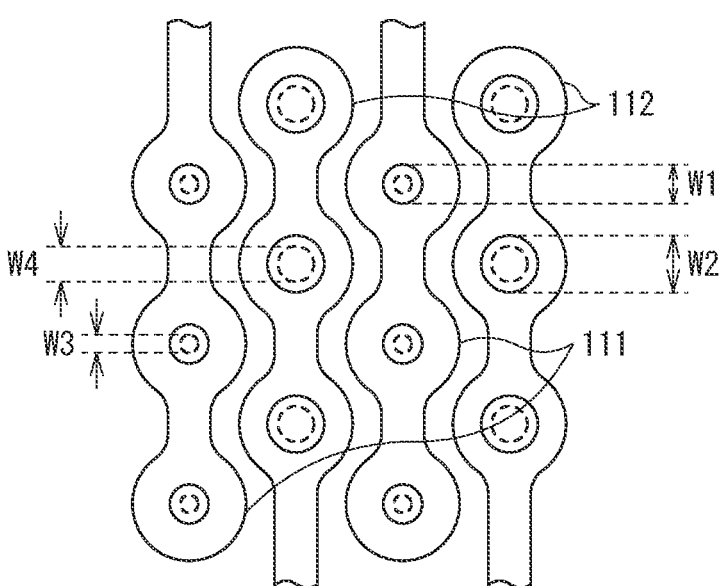

[ FIG. 8 ]
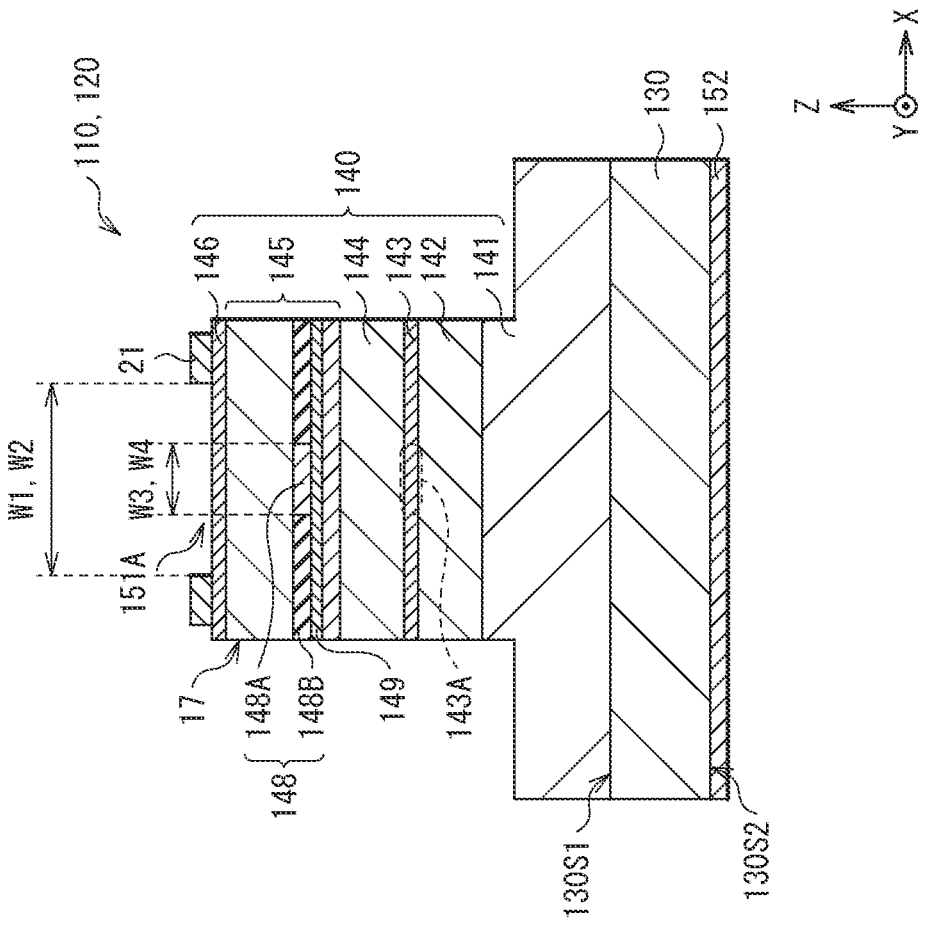

[ FIG. 9A ]
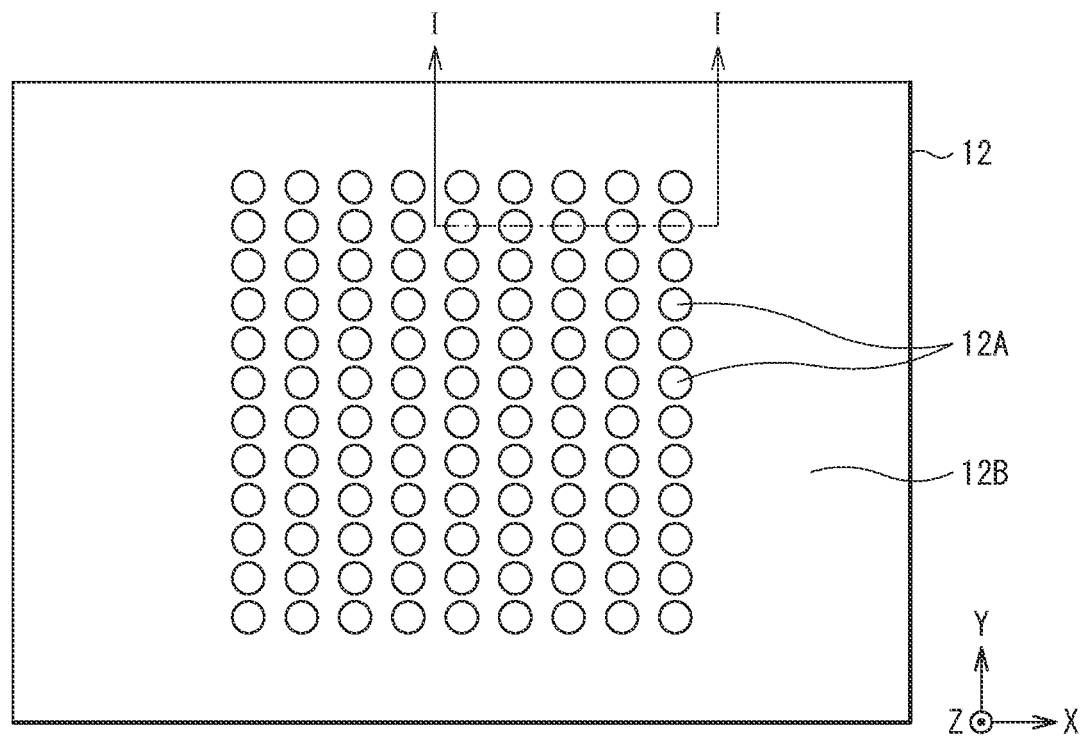
[ FIG. 9B ]
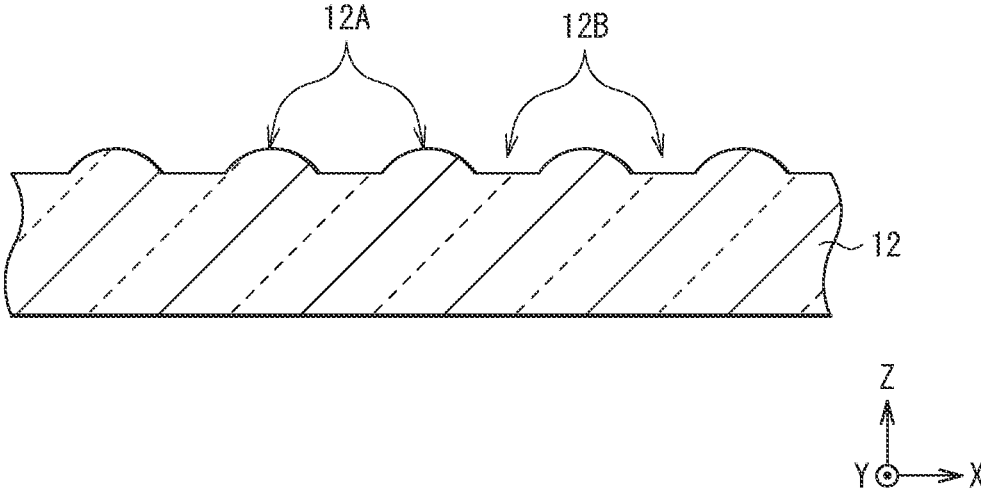

[ FIG. 10A ]
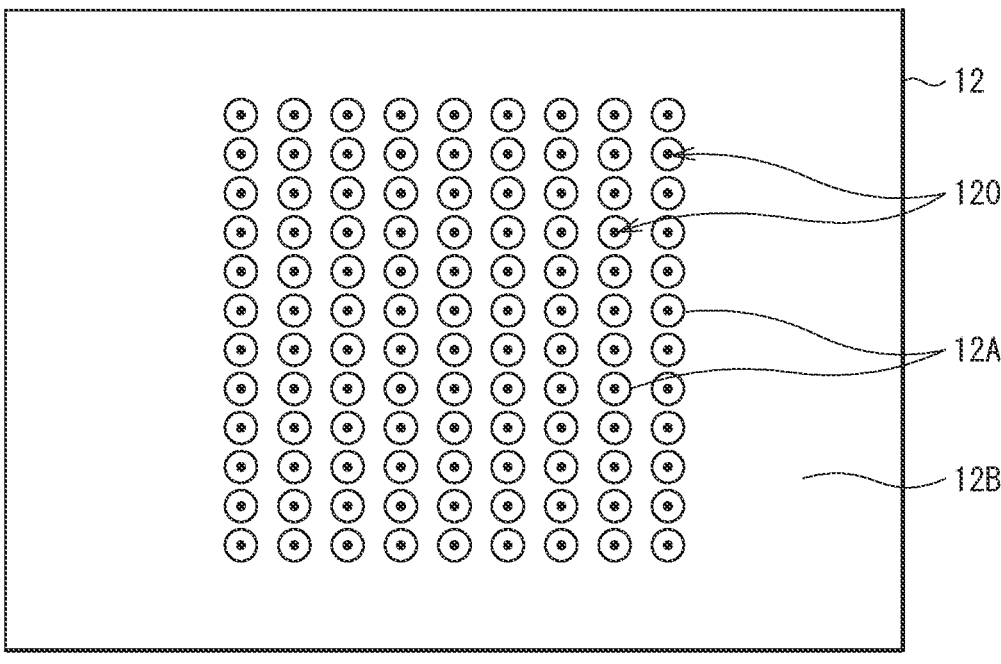
[ FIG. 10B ]
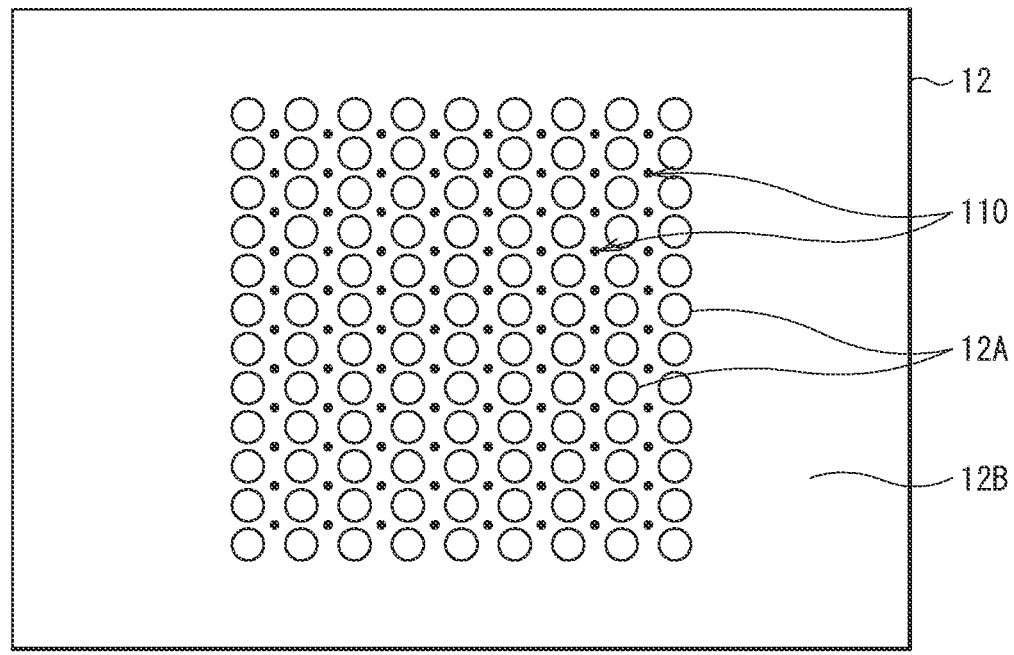

[ FIG. 11 ]
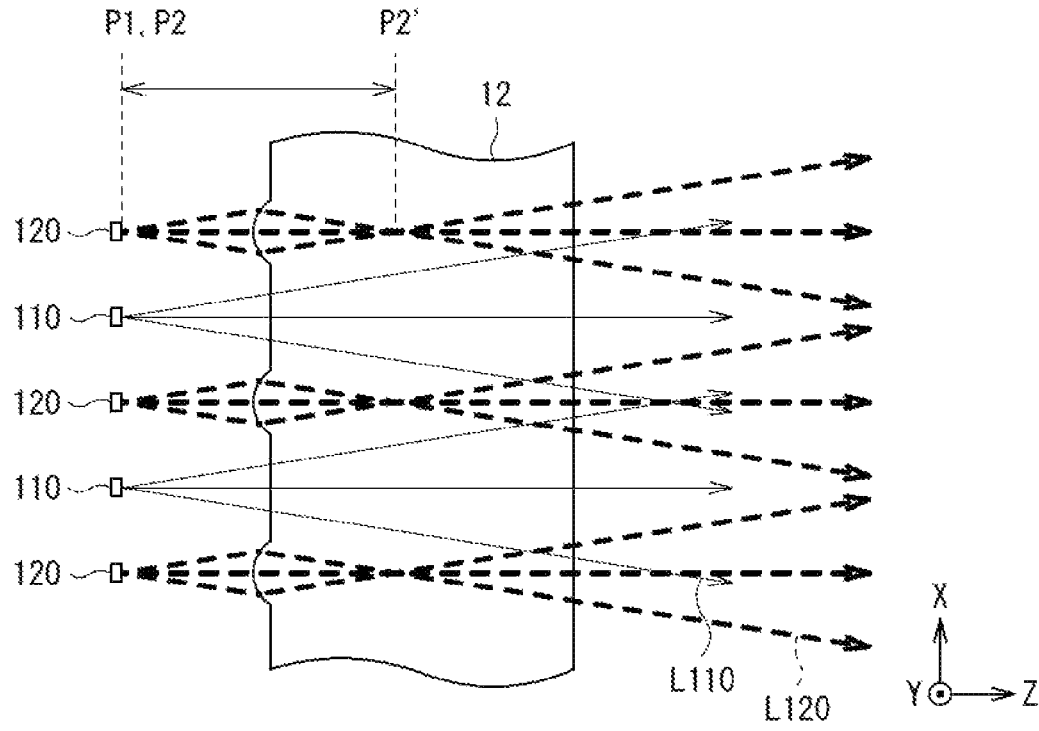
[ FIG. 12 ]
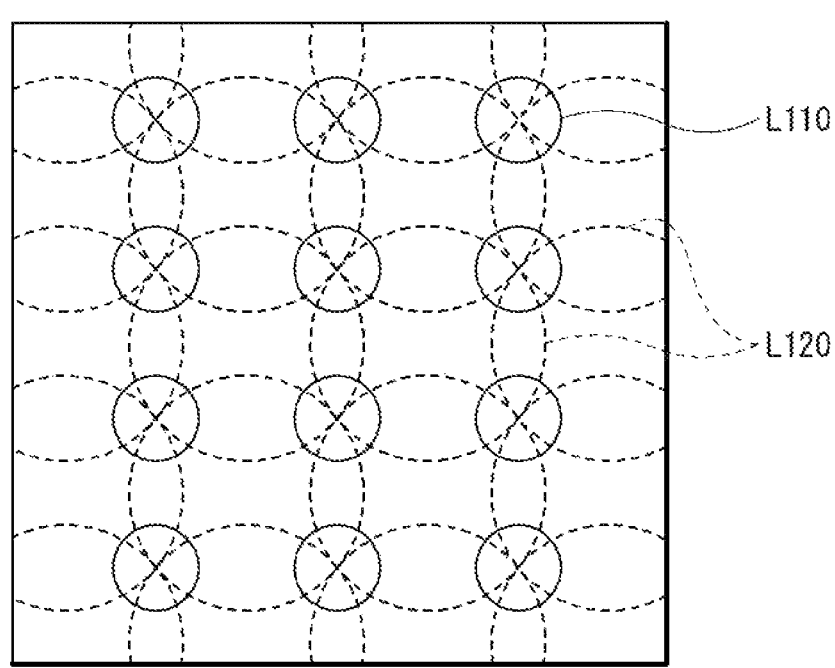

[ FIG. 13 ]
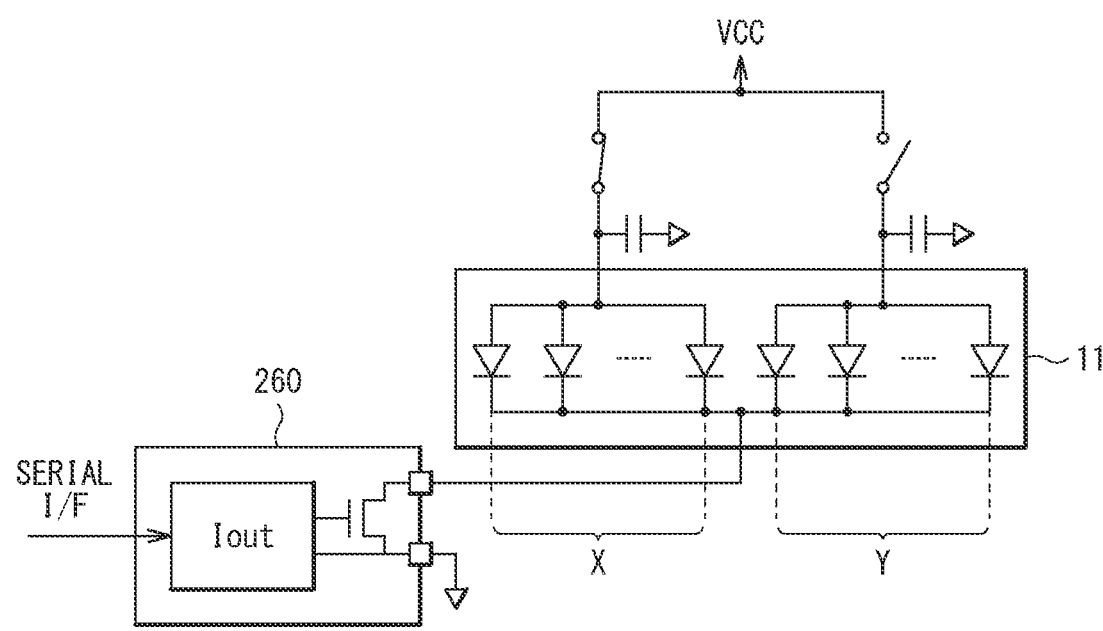
[ FIG. 14 ]
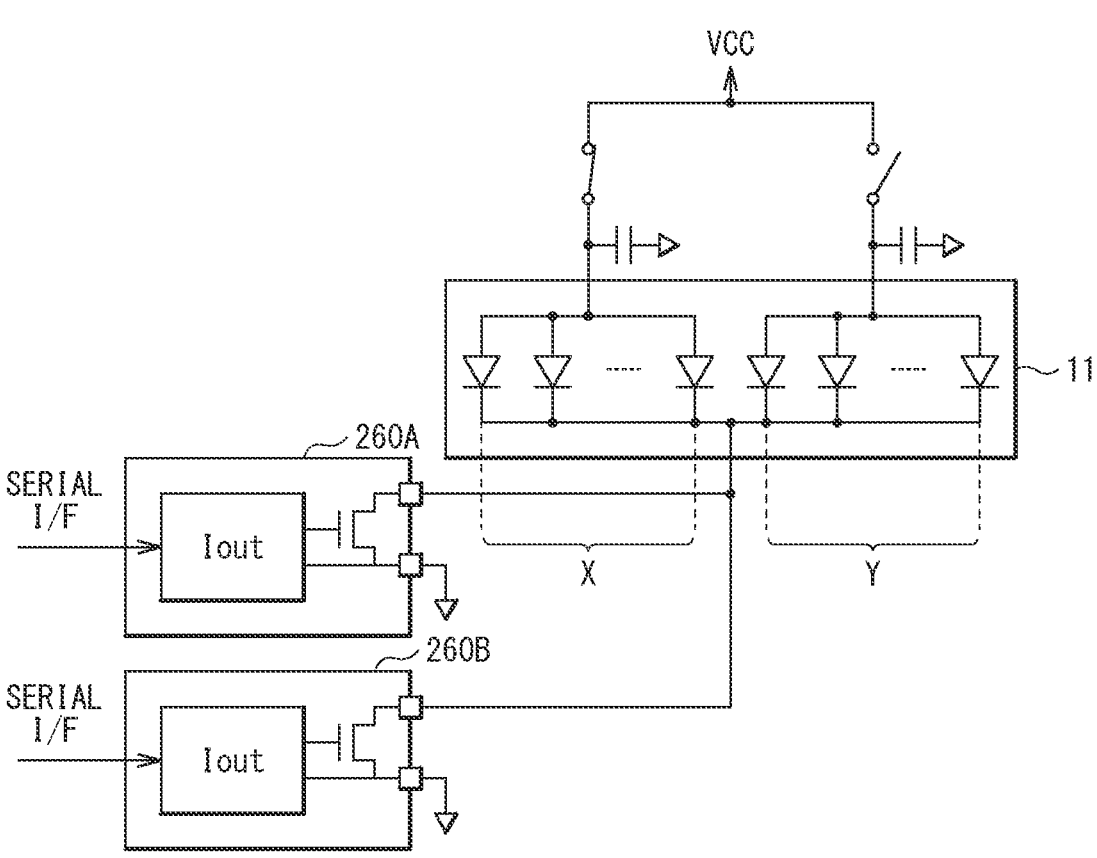

[ FIG. 15 ]
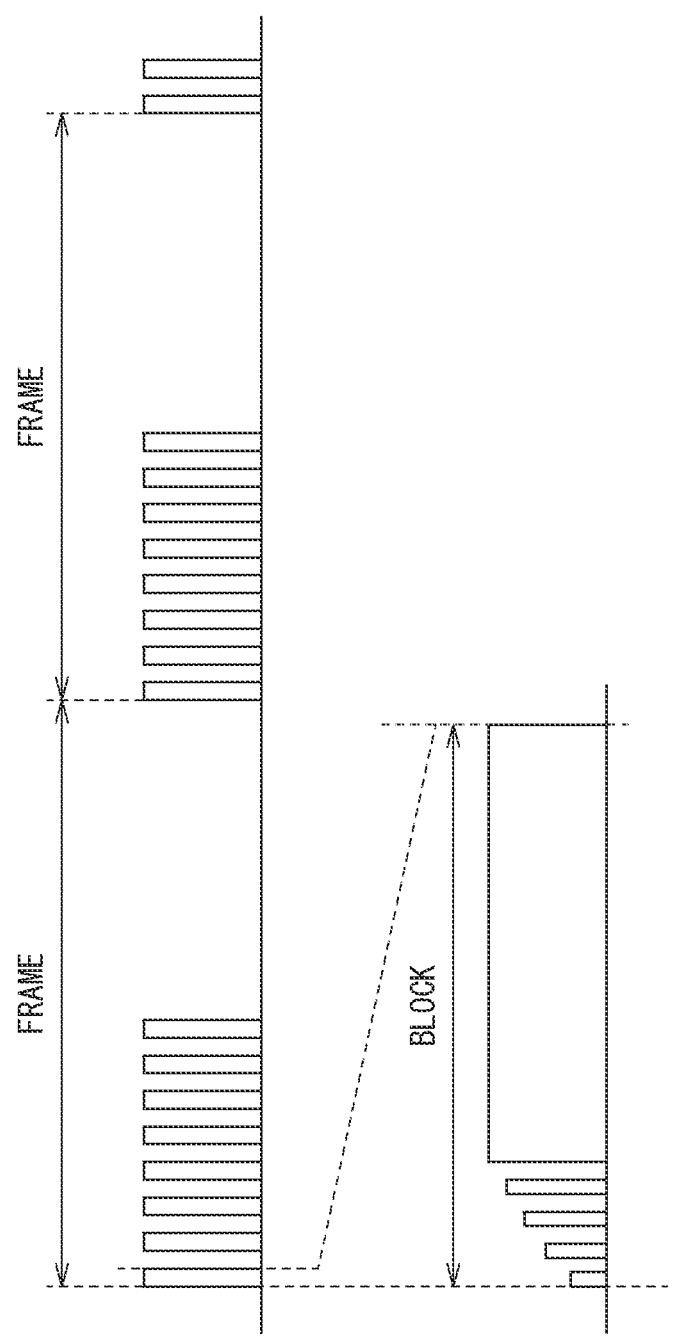

[ FIG. 16 ]
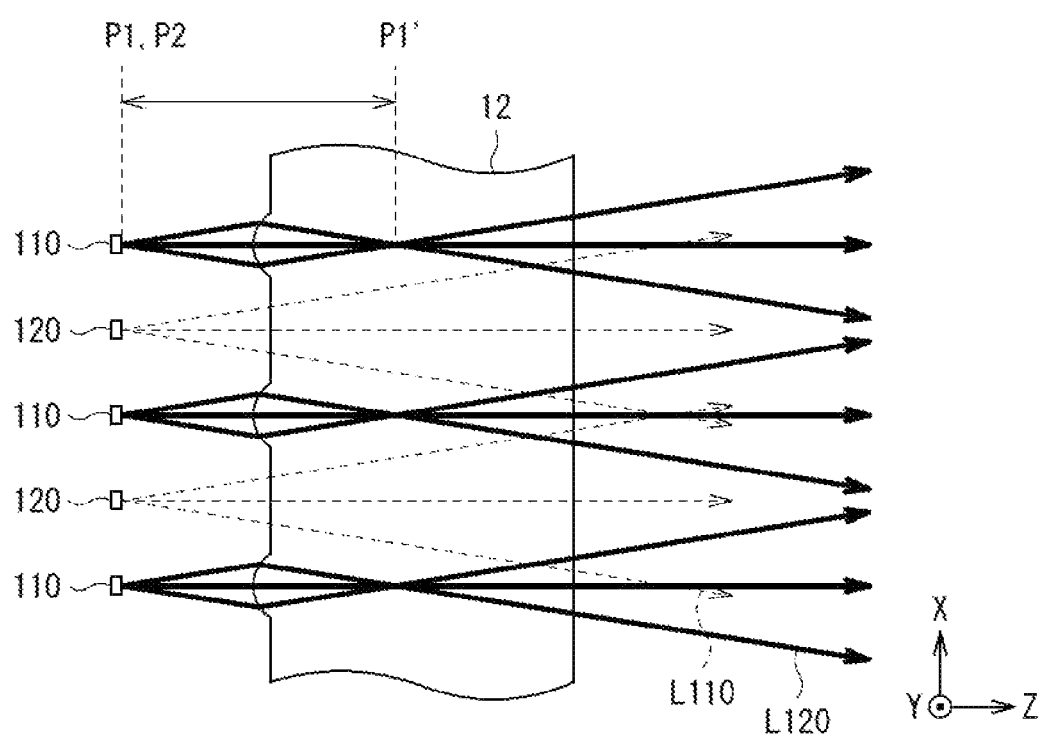

[ FIG. 17A ]
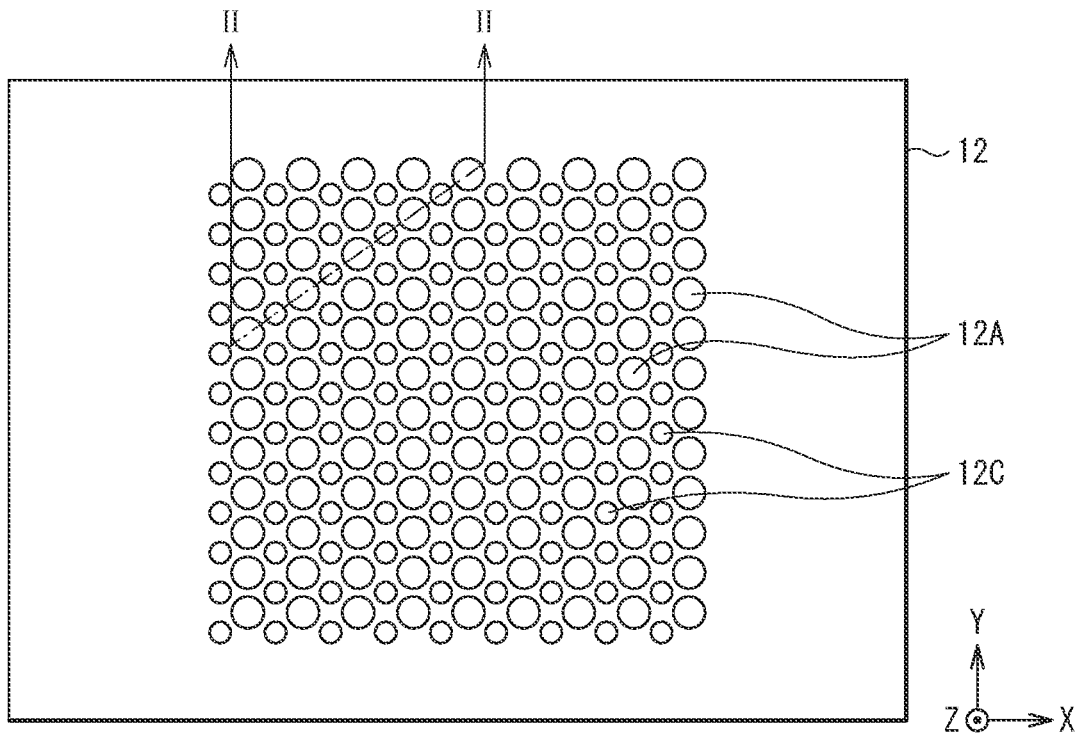
[ FIG. 17B ]
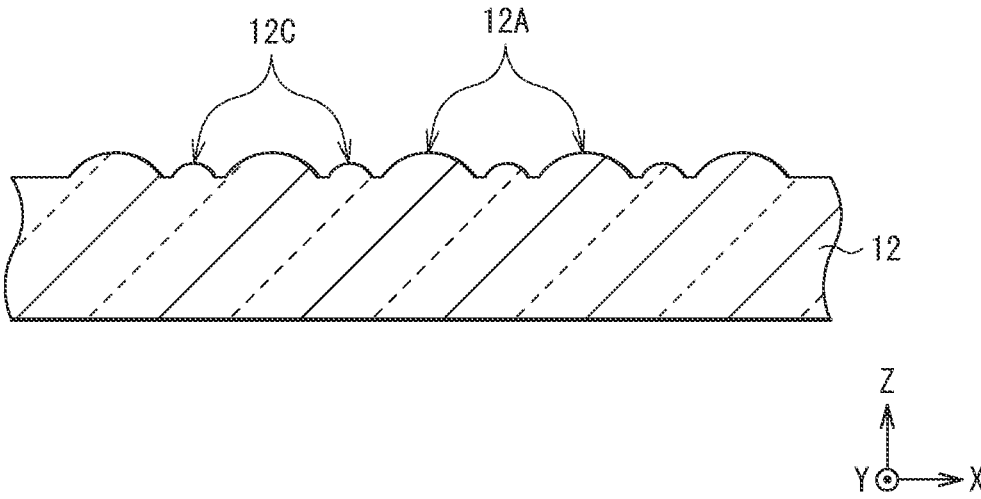

[ FIG. 18 ]
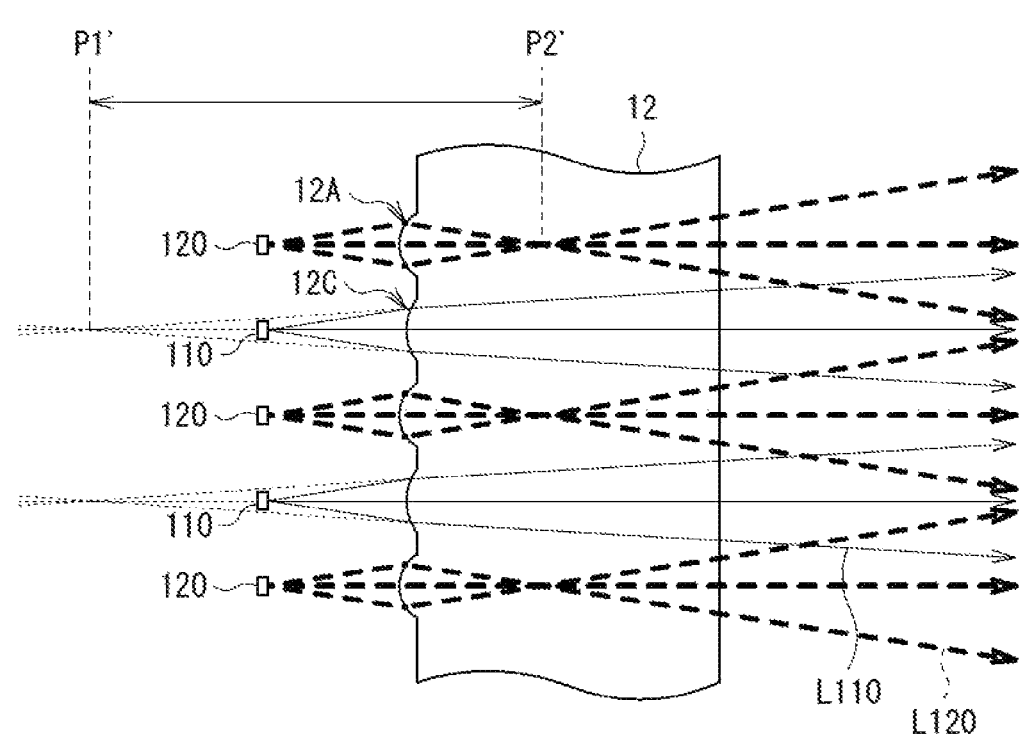
[ FIG. 19 ]
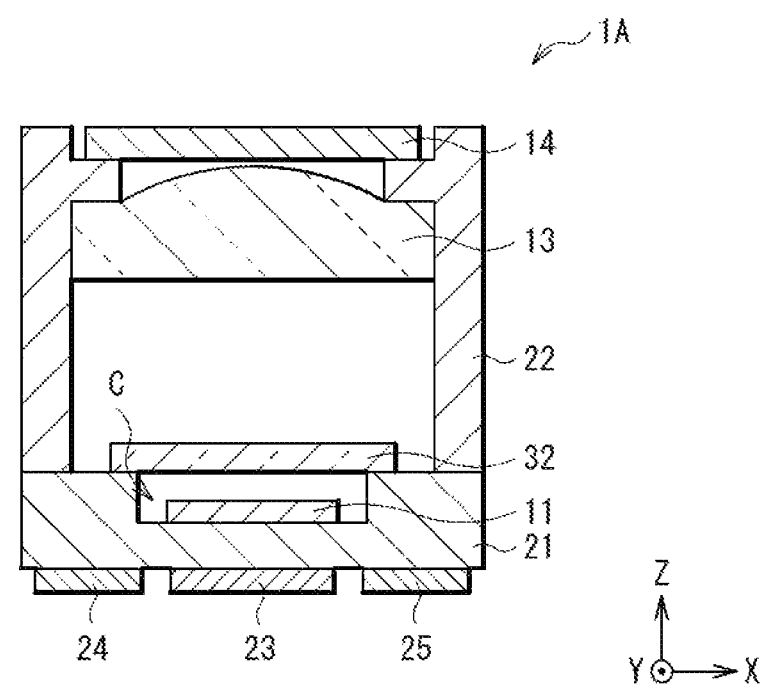

[ FIG. 20 ]
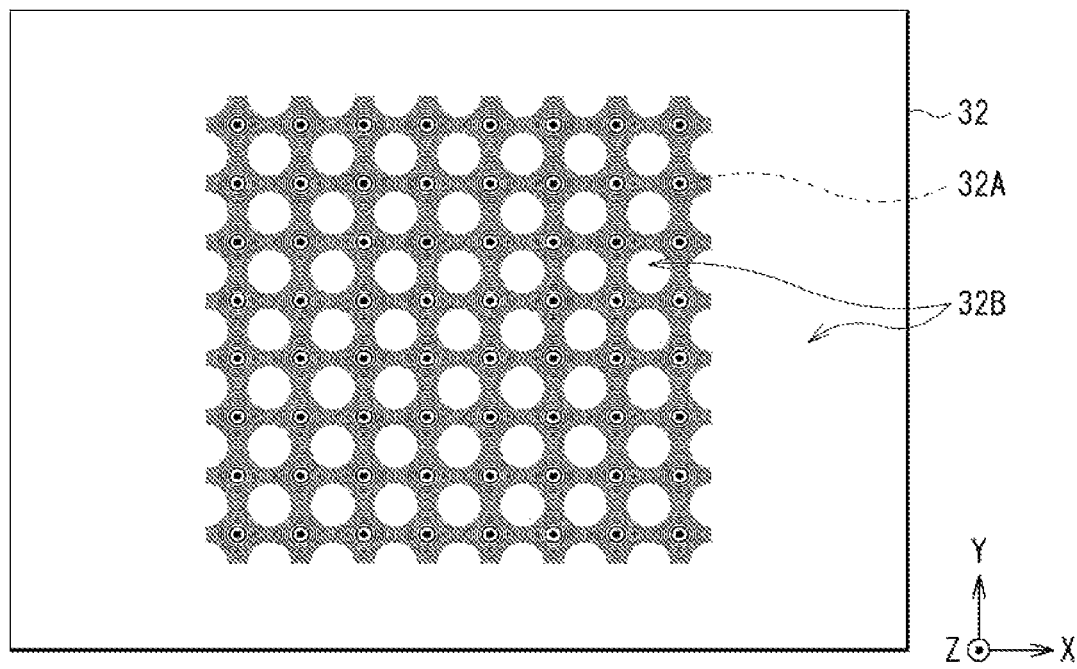
[ FIG. 21 ]
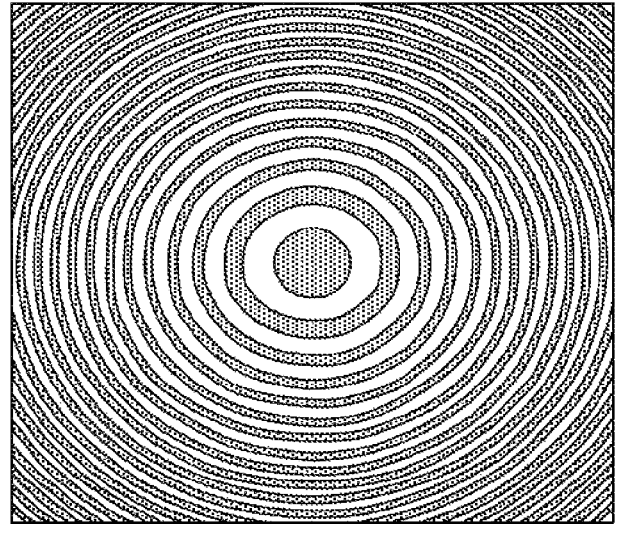

[ FIG. 22 ]
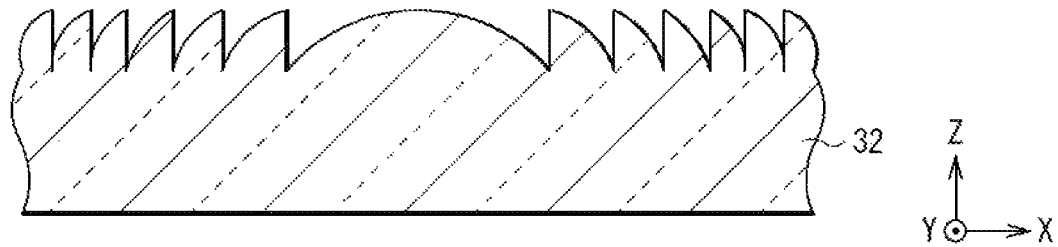
32
[ FIG. 23 ]
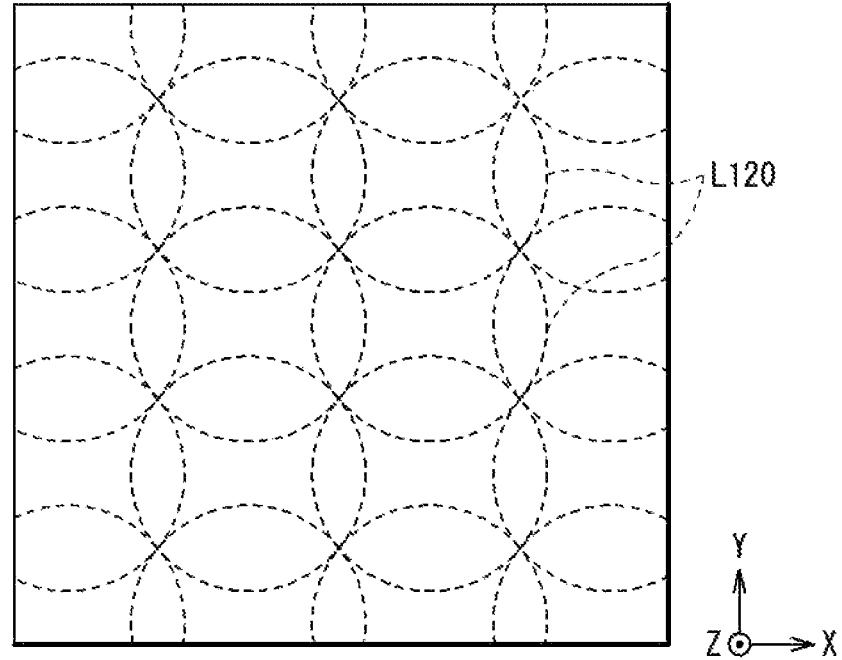
L120

[ FIG. 24 ]
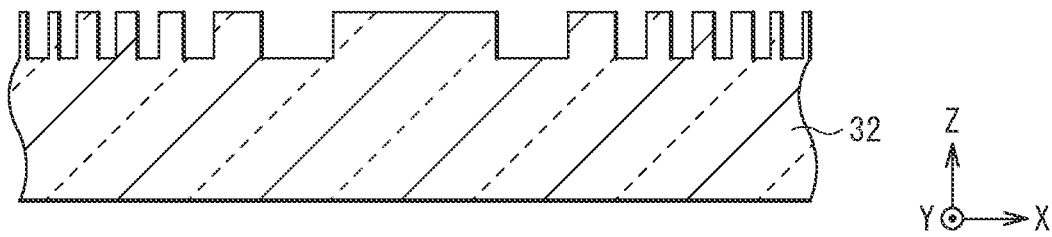
[ FIG. 25 ]
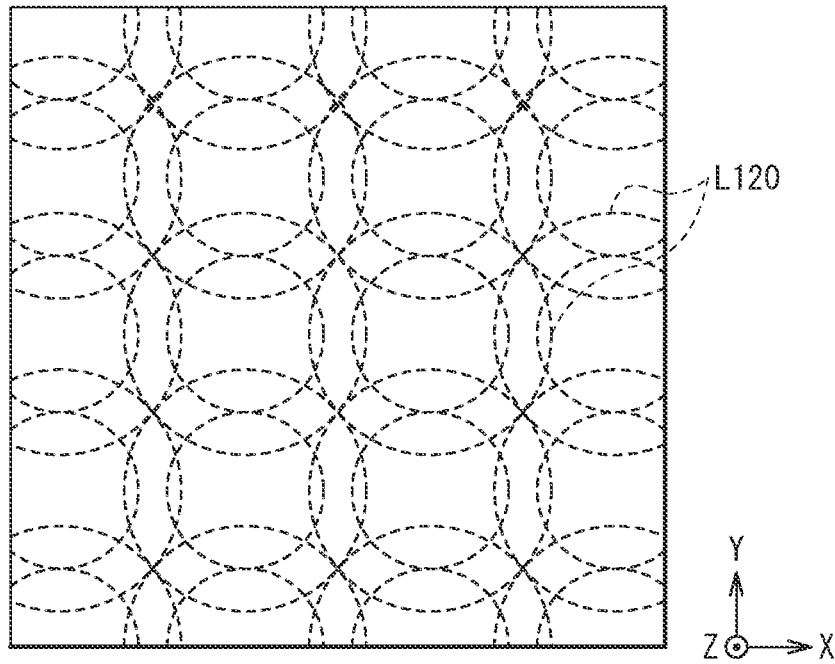

[ FIG. 26A ]
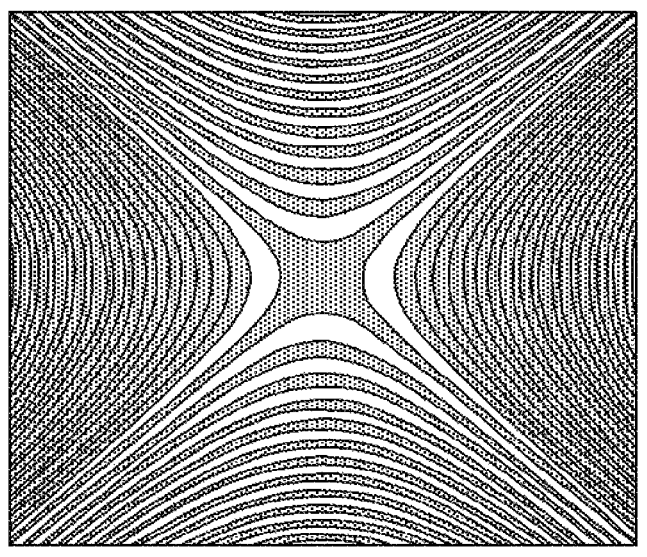
[ FIG. 26B ]
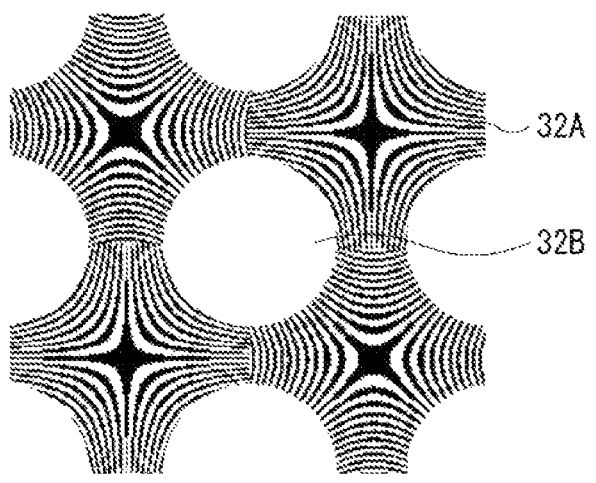

[ FIG. 27 ]
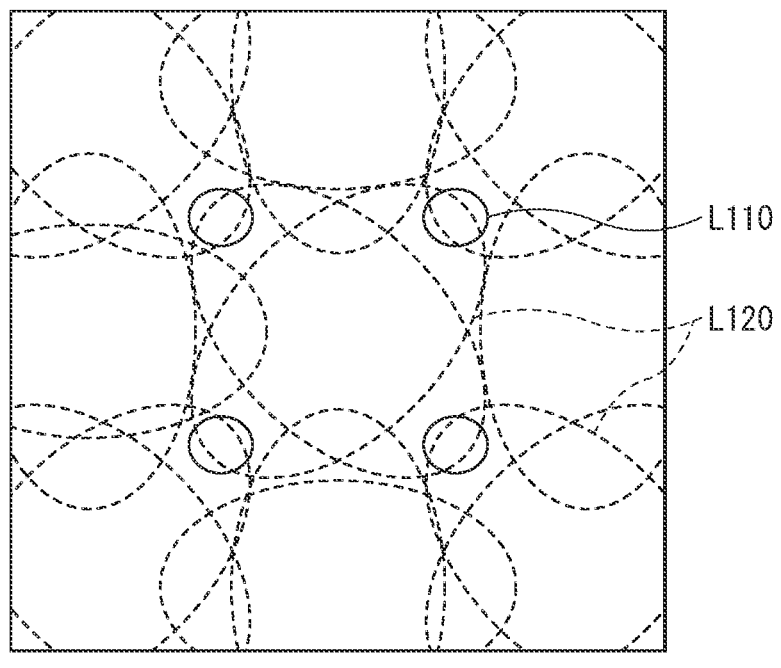
[ FIG. 28 ]
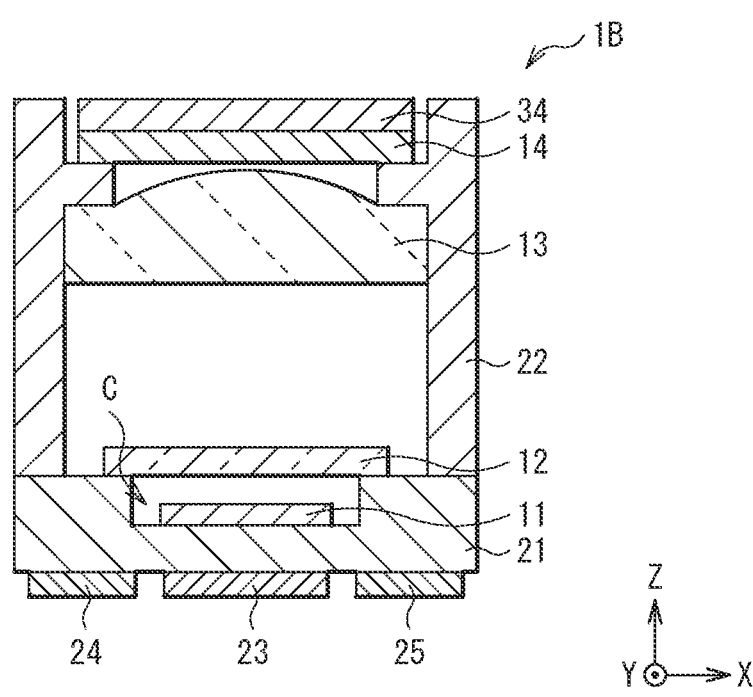

[ FIG. 29A ]
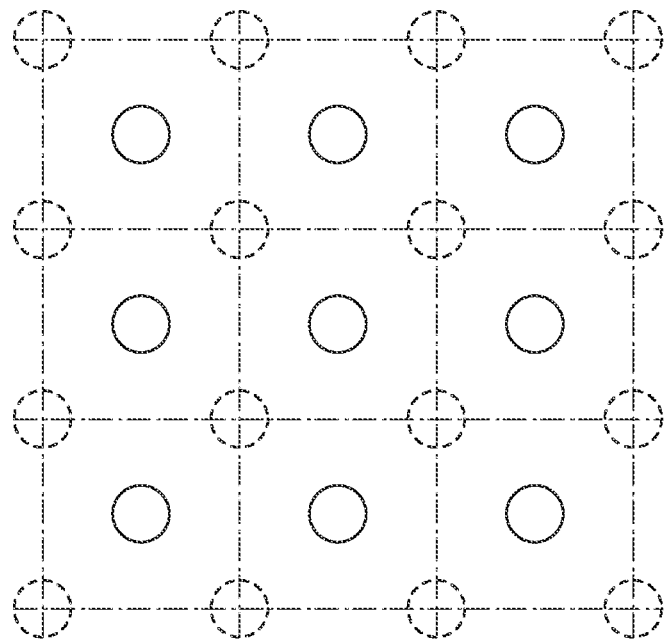
[ FIG. 29B ]
$110X_{+1}$  $110X_0$  $110X_{-1}$
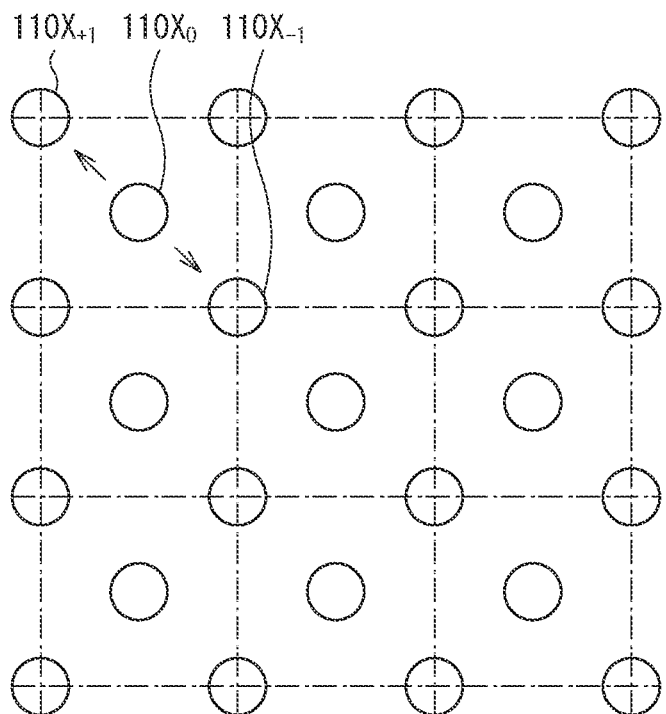

[ FIG. 30 ]
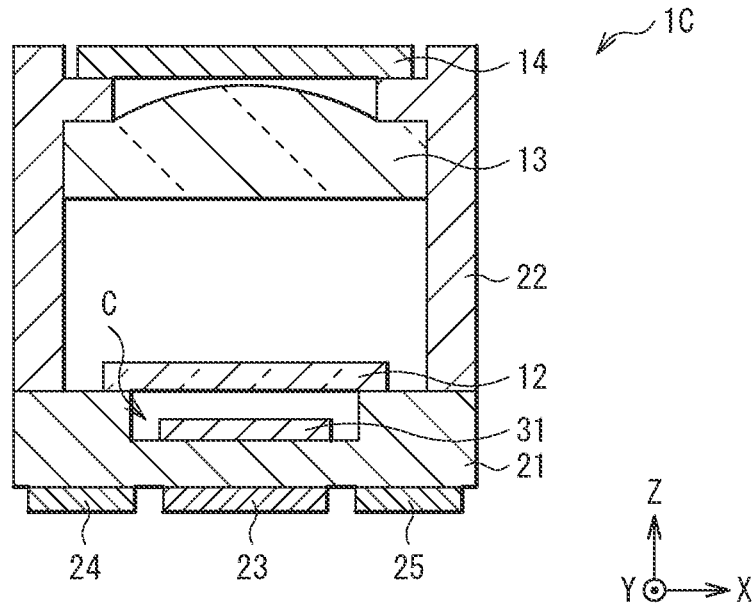
[ FIG. 31 ]
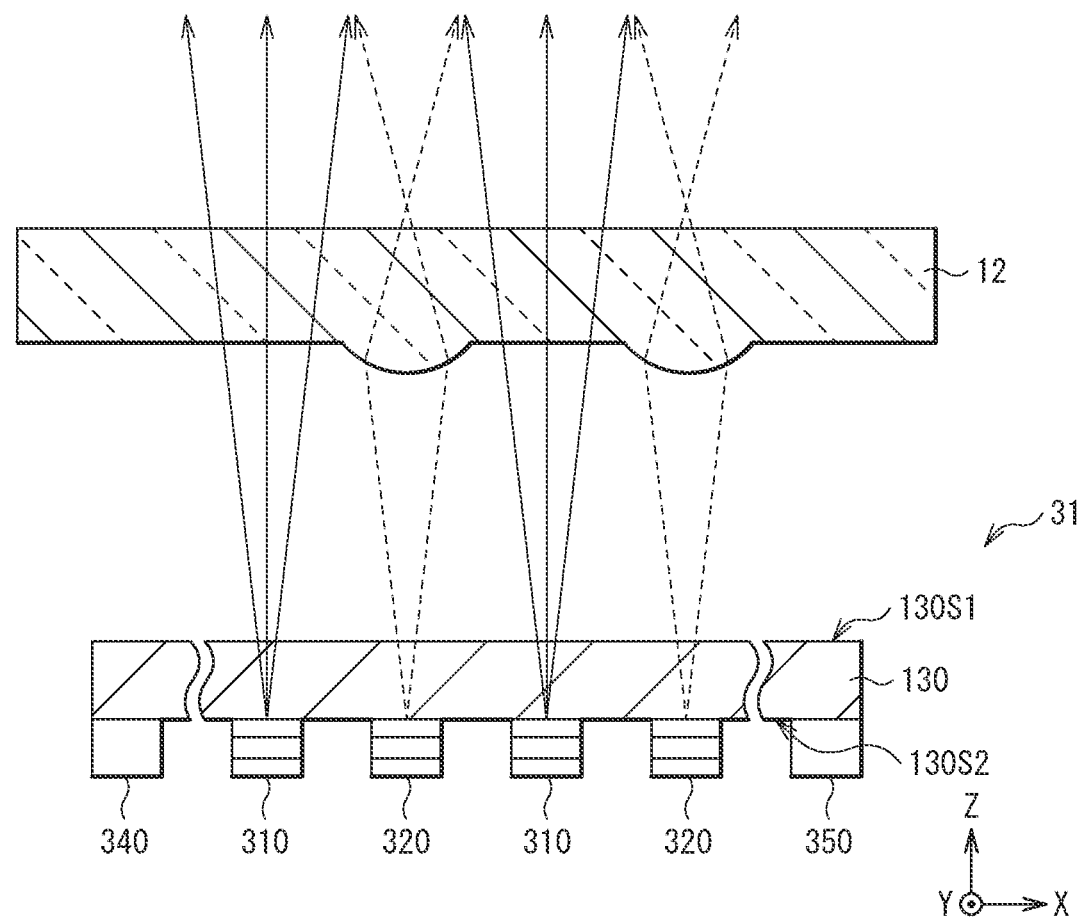

[ FIG. 32 ]
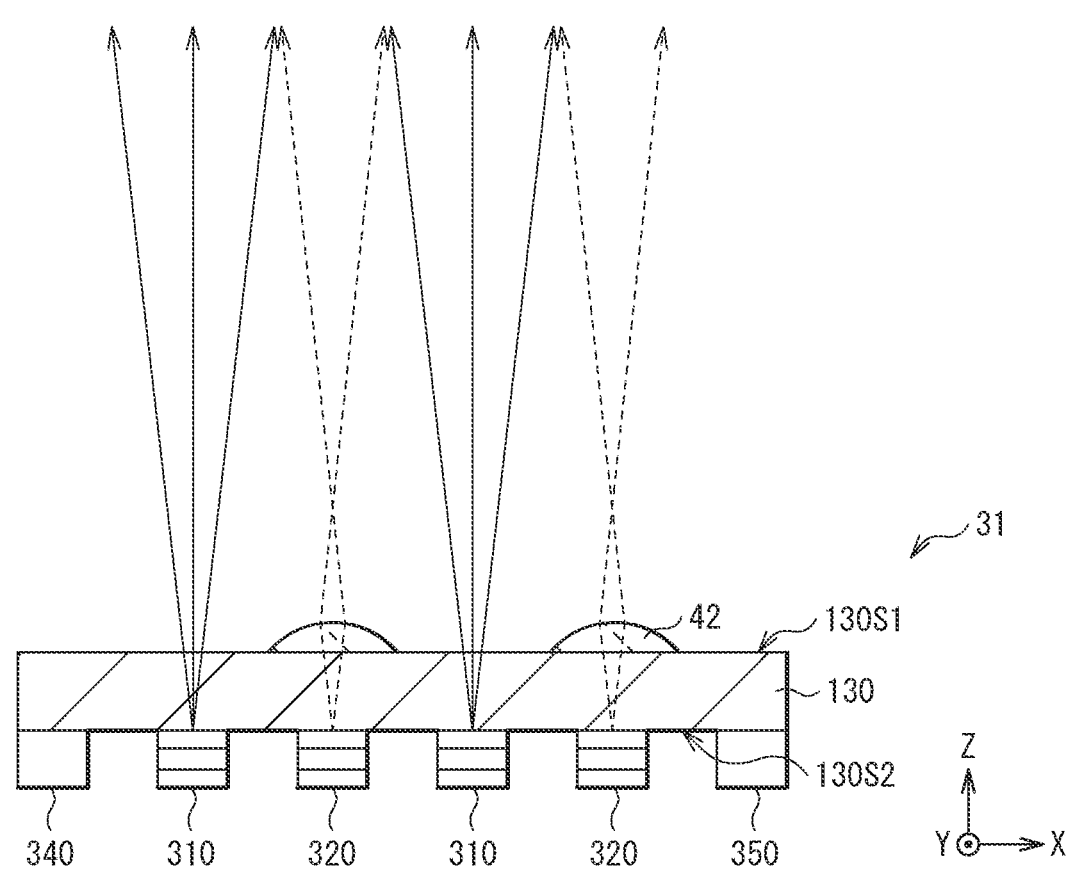
[ FIG. 33 ]
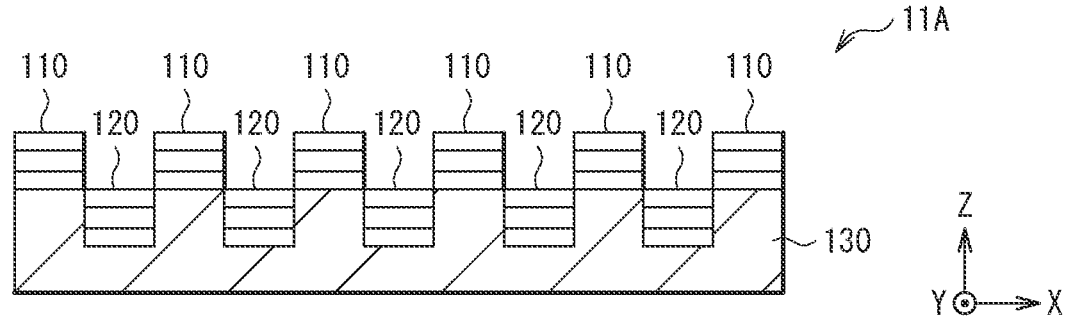

[ FIG. 34 ]
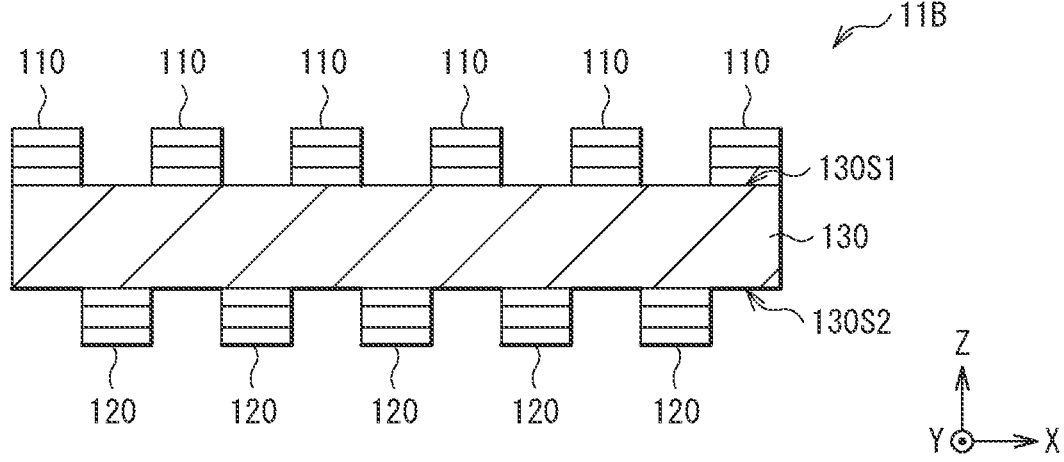
[ FIG. 35 ]
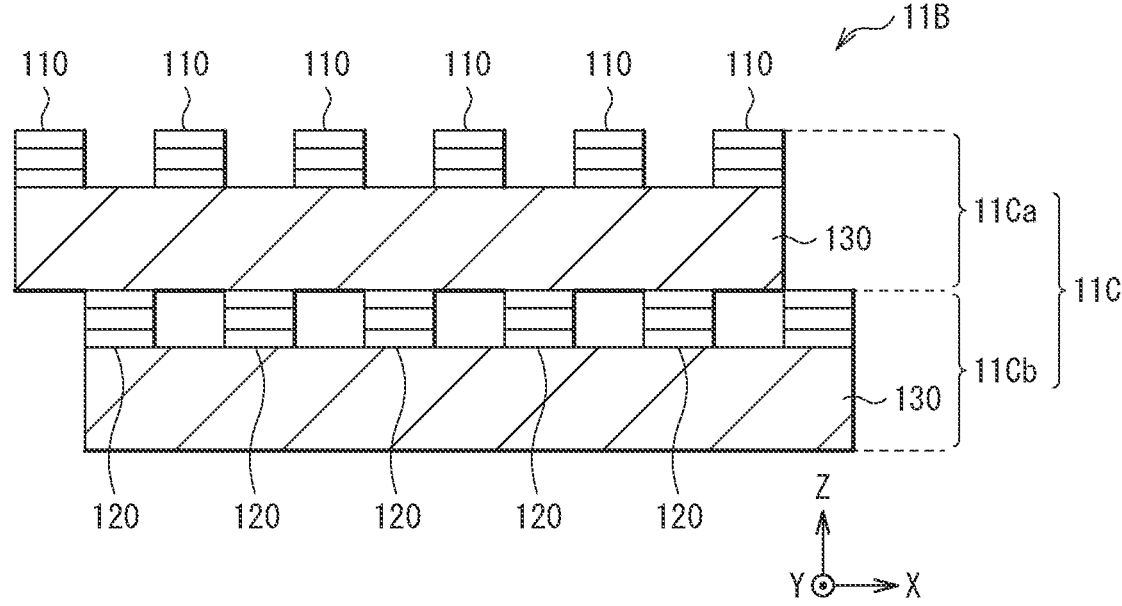

LIGHTING DEVICE AND DISTANCE MEASUREMENT APPARATUS

TECHNICAL FIELD

The present disclosure relates to: a lighting device including, for example, a surface-emitting semiconductor laser as a light-emitting element; and a distance measurement apparatus including the lighting device.

BACKGROUND ART

As one of distance measurement methods, there is a method of measuring spatial propagation time of light (Time of Flight (TOF) method). As a method of widely measuring a short distance, there is a method including: diffusing, by a diffuser, light outputted from multiple light-emitting sections; uniformly applying the diffused light on an entire surface of a measurement target range; and detecting the applied light by a photodetector having a light receiver that is divided two-dimensionally. As a method of extending a measurement distance, there is a method of: causing, by a collimator lens, light beams outputted from multiple light-emitting sections to be substantially collimated; and applying spot-shaped light beams on a measurement object (spot irradiation). For example, PTL 1 discloses an optical projector that is able to perform uniform irradiation and spot irradiation by adjusting a position of a collimator lens.

CITATION LIST

Patent Literature

PTL 1: U.S. Unexamined Patent Application Publication No. 2019/0018137

SUMMARY OF THE INVENTION

Miniaturization of a distance measurement apparatus is desired.

It is desirable to provide a lighting device and a distance measurement apparatus that are able to be miniaturized.

A first lighting device according to an embodiment of the present disclosure includes: a light-emitting element having multiple first light-emitting sections and multiple second light-emitting sections; a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light; and a second optical member that shapes beam shapes of the multiple pieces of first light, beam shapes of the multiple pieces of second light, or both the beam shapes of the multiple pieces of first light and the beam shapes of the multiple pieces of second light, and outputs the multiple pieces of first light and the multiple pieces of second light in a manner that the beam shapes are different between the multiple pieces of first light and the multiple pieces of second light.

A distance measurement apparatus according to an embodiment of the present disclosure includes: a lighting device that outputs light to an object; a light receiver that detects a received light amount of light reflected from the object; and a distance measurement section that measures a distance to the object on the basis of the received light amount. The lighting device included in the distance measurement apparatus has components that are the same as those of the lighting device according to the embodiment described above.

A second lighting device according to an embodiment of the present disclosure includes: a light-emitting element having multiple first light-emitting sections and multiple second light-emitting sections; a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light; a second optical member that shapes beam shapes of the multiple pieces of second light outputted from the multiple second light-emitting sections, and outputs the multiple pieces of second light; and a driver that independently control the first light-emitting section and the second light-emitting section to be switched between a lighting-on state and a lighting-off state. The lighting device applies each of the multiple pieces of first light on a target as a spot-shaped light beam, and applies each of the multiple pieces of second light on the target as a substantially uniform light beam.

The first lighting device according to the embodiment of the present disclosure, the second lighting device according to the embodiment of the present disclosure, and the distance measurement apparatus according to the embodiment of the present disclosure are each provided with the second optical member that shapes the beam shapes of the pieces of light (the multiple pieces of first light, the multiple pieces of second light, or both) to be outputted from the light-emitting element having the multiple first light-emitting sections and the multiple second light-emitting sections, and outputs the pieces of light. This causes a position of a light-emitting point of the multiple pieces of first light to be different in an optical axis direction from a position of a light-emitting point of the multiple pieces of second light.

BRIEF DESCRIPTION OF DRAWINGS

FIG. 1 is a schematic cross-sectional view of an example of a schematic configuration of a lighting device according to an embodiment of the present disclosure.

FIG. 2 is a block diagram illustrating an example of a schematic configuration of a distance measurement apparatus including the lighting device illustrated in FIG. 1.

FIG. 3 is a diagram illustrating an irradiation pattern based on a timing at which spot irradiation is performed by the lighting device illustrated in FIG. 1.

FIG. 4 is a diagram illustrating an irradiation pattern based on a timing at which uniform irradiation is performed by the lighting device illustrated in FIG. 1.

FIG. 5 is a diagram illustrating an irradiation pattern in a case of simultaneously performing the spot irradiation and the uniform irradiation.

FIG. 6 is a schematic view of an example of a plane configuration of a light-emitting element illustrated in FIG. 1.

FIG. 7 is a schematic view illustrating an example of a shape of each light-emitting section of the light-emitting element illustrated in FIG. 6.

FIG. 8 is a schematic cross-sectional view of an example of a configuration of the light-emitting section of the light-emitting element illustrated in FIG. 1.

FIG. 9A is a schematic plan view of an example of a configuration of a microlens array illustrated in FIG. 1.

FIG. 9B is a schematic view of an example of a cross-sectional configuration of the microlens array illustrated in FIG. 9A.

FIG. 10A is a schematic view of positions of light-emitting sections for spot irradiation on the microlens array illustrated in FIG. 9A.

FIG. 10B is a schematic view of positions of light-emitting sections for uniform irradiation on the microlens array illustrated in FIG. 9A.

FIG. 11 is a diagram illustrating a beam shaping function according to an embodiment of the present disclosure.

FIG. 12 is a diagram illustrating an irradiation pattern on a target according to an embodiment of the present disclosure.

FIG. 13 is a diagram illustrating an example of a configuration of a drive circuit of the lighting device illustrated in FIG. 1.

FIG. 14 is a diagram illustrating another example of the configuration of the drive circuit of the lighting device illustrated in FIG. 1.

FIG. 15 is a diagram illustrating a light-emission sequence of the lighting device illustrated in FIG. 1.

FIG. 16 is a diagram illustrating a beam shaping function according to a modification example 1 of the present disclosure.

FIG. 17A is a schematic plan view of an example of a configuration of a microlens array according to a modification example 2 of the present disclosure.

FIG. 17B is a schematic view of an example of a cross-sectional configuration of the microlens array illustrated in FIG. 17A.

FIG. 18 is a diagram illustrating a beam shaping function according to the modification example 2 of the present disclosure.

FIG. 19 is a schematic cross-sectional view of an example of a schematic configuration of a lighting device according to a modification example 3 of the present disclosure.

FIG. 20 is a schematic plan view of an example of a configuration of a diffractive optical element illustrated in FIG. 19.

FIG. 21 is a diagram illustrating an example of a plane pattern of a lens portion of the diffractive optical element illustrated in FIG. 20.

FIG. 22 is a diagram illustrating a cross-sectional pattern of the lens portion of the diffractive optical element illustrated in FIG. 20.

FIG. 23 is a diagram illustrating an irradiation pattern based on a timing at which the uniform irradiation is performed on a target via the diffractive optical element illustrated in FIG. 20.

FIG. 24 is a diagram illustrating another example of a cross-sectional pattern of the lens portion of the diffractive optical element illustrated in FIG. 19.

FIG. 25 is a diagram illustrating an irradiation pattern based on a timing at which the uniform irradiation is performed on a target via the diffractive optical element illustrated in FIG. 24.

FIG. 26A is a diagram illustrating another example of the plane pattern of the lens portion of the diffractive optical element illustrated in FIG. 19.

FIG. 26B is an enlarged view of the plane pattern of the lens portion of the diffractive optical element illustrated in FIG. 19.

FIG. 27 is a diagram illustrating an irradiation pattern based on a timing at which the uniform irradiation is performed on a target via the diffractive optical element illustrated in FIG. 26.

FIG. 28 is a schematic cross-sectional view of an example of a schematic configuration of a lighting device according to a modification example 4 of the present disclosure.

FIG. 29A is a diagram illustrating irradiation positions of pieces of light which are to be applied on a target from light-emitting sections for spot irradiation and light-emitting sections for uniform irradiation.

FIG. 29B is a diagram illustrating irradiation positions, on the target, of pieces of light which are to be outputted from the light-emitting sections for spot irradiation via a diffraction grating illustrated in FIG. 28.

FIG. 30 is a schematic cross-sectional view of an example of a schematic configuration of a lighting device according to a modification example 5 of the present disclosure.

FIG. 31 is a diagram illustrating an example of a cross-sectional configuration of a light-emitting element in the lighting device illustrated in FIG. 30 and a positional relationship with a microlens array.

FIG. 32 is a schematic cross-sectional view illustrating another configuration of the lighting device illustrated in FIG. 30.

FIG. 33 is a schematic view of another example of a cross-sectional configuration of a light-emitting element according to a modification example 6 of the present disclosure.

FIG. 34 is a schematic view of another example of the cross-sectional configuration of the light-emitting element according to the modification example 6 of the present disclosure.

FIG. 35 is a schematic view of another example of the cross-sectional configuration of the light-emitting element according to the modification example 6 of the present disclosure.

MODES FOR CARRYING OUT THE INVENTION

The following describes embodiments of the present disclosure in detail with reference to the drawings. The following description is a specific example of the present disclosure, but the present disclosure is not limited to the following embodiments. In addition, the present disclosure is not limited to arrangement, dimensions, dimensional ratios, and the like of the constituent elements illustrated in the drawings. It is to be noted that description is given in the following order.

1. Embodiment (An example of a lighting device including a microlens array as an optical element having a beam shaping function)
1-1. Configuration of Lighting Device
1-2. Method of Driving Lighting Device
1-3. Configuration of Distance Measurement Apparatus
1-4. Workings and Effects
2. Modification Examples
2-1. Modification Example 1 (Another example of a positional relationship between each light-emitting section and the microlens array)
2-2. Modification Example 2 (Another example of a configuration of the microlens array)
2-3. Modification Example 3 (An example in which a diffractive optical element is used as an optical element having a beam shaping function)
2-4. Modification Example 4 (An example in which a grating is provided in a subsequent stage of a collimator lens)

2-5. Modification Example 5 (An example in which a back side output type surface-emitting laser is used as a light-emitting element)

2-6. Modification Example 6 (Another example of a configuration of the light-emitting element)

1. Embodiment

FIG. 1 is a schematic cross-sectional view of an example of a schematic configuration of a lighting device (lighting device 1) according to an embodiment of the present the present disclosure. FIG. 2 is a block diagram illustrating a schematic configuration of a distance measurement apparatus (distance measurement apparatus 100) including the lighting device 1 illustrated in FIG. 1. The lighting device 1 according to the present embodiment shapes beam shapes of, out of light L1 and light L2 to be outputted from a light-emitting element 11 having multiple light-emitting sections (light-emitting sections 110 and 120, see FIG. 6), the light L2, for example, and performs spot irradiation as illustrated in FIG. 3, uniform irradiation as illustrated in FIG. 4, and the spot irradiation and the uniform irradiation simultaneously as illustrated in FIG. 5, for example, on an irradiation target object 1000.

1-1. Configuration of Lighting Device

The lighting device 1 includes, for example, the light-emitting element 11, a microlens array 12, a collimator lens 13, and a diffractive element 14. The microlens array 12, the collimator lens 13, and the diffractive element 14 are disposed on an optical path of the pieces of light (light L1 and light L2) outputted from the light-emitting element 11, for example, in this order. The light-emitting element 11 and the microlens array 12 are held, for example, by a holding section 21, and the collimator lens 13 and the diffractive element 14 are held, for example, by a holding section 22. The holding section 21 includes, for example, one cathode electrode 23 and two anode electrodes 24 and 25 on a surface 21S2 opposite to a surface 21S1 holding the light-emitting element 11 and the microlens array 12. Hereinafter, each member included in the lighting device 1 will be described in detail.

The light-emitting element 11 is, for example, a surface-emitting semiconductor laser including multiple light-emitting sections. The multiple light-emitting sections have a configuration in which, for example, multiple light-emitting sections to be used for spot irradiation (multiple light-emitting sections 110 for spot irradiation) and multiple light-emitting sections to be used for uniform irradiation (multiple light-emitting sections 120 for uniform irradiation) are disposed in an array on a substrate 130, for example. The multiple light-emitting sections 110 are electrically isolated from the multiple light-emitting sections 120.

The multiple light-emitting sections 110 are electrically coupled to each other and the multiple light-emitting sections 120 are electrically coupled to each other. Specifically, for example, as illustrated in FIG. 6, the multiple light-emitting sections 110 configure multiple (e.g., nine in FIG. 6) light-emitting section groups X (light-emitting section groups X1 to X9) including n-number of (e.g., 12 in FIG. 6) light-emitting sections 110 extending in one direction (e.g., a Y-axis direction). Similarly, the multiple light-emitting sections 120 configure multiple (e.g., nine in FIG. 6) light-emitting section groups Y (light-emitting section groups X1 to X9 including m-number of (e.g., nine in FIG. 6) light-emitting sections 120 extending in one direction (e.g., the Y-axis direction). As illustrated in FIG. 6, for example, the light-emitting section groups X1 to X9 and the light-emitting section groups Y1 to Y9 are alternately disposed on the substrate 130 having a rectangular shape. The light-emitting section groups X1 to X9 are electrically coupled to, for example, an electrode pad 240 provided along one side of the substrate 130. The light-emitting section groups Y1 to Y9 are electrically coupled to, for example, an electrode pad 250 provided along the other side opposed to the one side of the substrate 130. It is to be noted that, although FIG. 6 illustrates the example in which the light-emitting section groups X1 to X9 and Y1 to Y9 are alternately disposed, the present disclosure is not limited thereto. For example, the number of light-emitting sections 110 and light-emitting sections 120 may be any arrangement, depending on desired number, positions, and quantity of optical power, respectively, of light-emitting points. As an example, an array including the multiple light-emitting sections 120 may be disposed every two arrays each including the multiple light-emitting sections 110.

FIG. 7 is an enlarged view of a portion of the arrangement of the multiple light-emitting sections 110 and the multiple light-emitting sections 120 illustrated in FIG. 6. It is preferable that light-emission areas (OA diameters W3 and W4) be different between the multiple light-emitting sections 110 and the multiple light-emitting sections 120. Specifically, it is preferable that the light-emission areas (OA diameters W3) of the multiple light-emitting sections 110 for spot irradiation be smaller than the light-emission areas (OA diameters W4) of the multiple light-emitting sections 120 for uniform irradiation. As a result, light beams for spot irradiation (laser beams L110, see FIG. 12) outputted from the multiple light-emitting sections 110 are condensed to be smaller, and it is possible to irradiate a target with smaller spots of light beams. In addition, light beams for uniform irradiation (laser beams L120, see FIG. 12) outputted from the multiple light-emitting sections 120 are able to irradiate a larger range, and it is possible to perform the uniform irradiation on the irradiation target object 1000 more uniformly with higher power. In accordance with this, a width of an opening W1 of a wiring line that couples the multiple light-emitting sections 110 with each other is smaller than a width of an opening W2 of a wiring line that couples the multiple light-emitting sections 120 with each other.

FIG. 8 schematically illustrates an example of a cross-sectional configuration of the light-emitting section (light-emitting section 110, 120) of the light-emitting element 11. The light-emitting element 11 is a front side output type surface-emitting semiconductor laser. The light-emitting sections 110 and 120 each include a semiconductor layer 140 that includes, on one surface (front surface (surface 130S1)) side of the substrate 130, in the following order: a lower DBR layer 141; a lower spacer layer 142; an active layer 143; an upper spacer layer 144; an upper DBR layer 145; and a contact layer 146. An upper portion of the semiconductor layer 140, specifically, a portion of the lower DBR layer 141, i.e., the lower spacer layer 142, the active layer 143, the upper spacer layer 144, the upper DBR layer 145, and the contact layer 146, is in a form of a columnar mesa section 147.

The substrate 130 is, for example, an n-type GaAs substrate. Examples of an n-type impurity include silicon (Si) and selenium (Se). The semiconductor layer 140 includes an AlGaAs-based compound semiconductor. The AlGaAs-based compound semiconductor represents a compound semiconductor including at least aluminum (Al) and gallium (Ga) out of group 3B elements in the short period periodic table, and at least arsenic (As) out of group 5B elements in the short period periodic table.

The lower DBR layer 141 is configured by alternately stacking a low refractive index layer and a high refractive index layer (both not illustrated). The low refractive index layer includes, for example, n-type $(0<x1<1)$ having a thickness of $\lambda_0/4_{n1}$ ($\lambda$ represents a light emission wavelength, n1 represents a refractive index). The high refractive index layer includes, for example, n-type $Al_{x-2}Ga_{1-x2}As$ $(0<x2<x1)$ having a thickness of $\lambda_0/4_{n2}$ (n2 represents a refractive index).

The lower spacer layer 142 includes, for example, n-type $Al_{x-3}Ga_{1-x3}As$ $(0<x3<1)$. The active layer 143 includes, for example, undoped n-type $Al_{x-4}Ga_{1-x4}As$ $(0<x4<1)$, for example. The upper spacer layer 144 includes, for example, p-type $Al_{x-5}Ga_{1-x5}As$ $(0<x5<1)$. Examples of a p-type impurity include zinc (Zn), magnesium (Mg), and beryllium (Be).

The upper DBR layer 145 is configured by alternately stacking a low refractive index layer and a high refractive index layer (both not illustrated). The low refractive index layer includes, for example, p-type $Al_{x6}Ga_{1-x6}As$ $(0<x6<1)$ having a thickness of $\lambda_0/4n_3$ ($n_3$ represents a refractive index) $(0<x6<1)$. The high refractive index layer includes, for example, p-type $Al_{x7}Ga_{1-x7}As$ $(0<x7<x6)$ having a thickness of $\lambda_0/4n_4$ ($n_4$ represents a refractive index). The contact layer 16 includes, for example, p-type $Al_{x8}Ga_{1-x8}As$ $(0<x8<1)$.

The light-emitting element 11 is further provided with a current confining layer 148 and a buffer layer 149. The current confining layer 148 and the buffer layer 149 are provided within the upper DBR layer 145.

The current confining layer 148 is formed at a position away from the active layer 143 in relation to the buffer layer 149. The current confining layer 148 is provided, for example, within the upper DBR layer 145, in a part of a low refractive index layer several layers away counting from a side of the active layer 143, for example, and is provided in place of the low refractive index layer. The current confining layer 148 has a current injection region 148A and a current confining region 148B. The current injection region 148A is formed in a middle region in a surface and corresponds to the light-emission area (OA diameter W3, W4) of the light-emitting section 110, 120 described above. The current confining region 148B is formed on the periphery of the current injection region 148A, i.e., in an outer edge region of the current confining layer 148, and has a ring shape.

The current injection region 148A includes, for example, p-type $Al_{x9}Ga_{1-x9}As$ $(0.98 \leq x9 \leq 1)$. The current confining region 148B includes, for example, aluminum oxide $(Al_2O_3)$, and is obtained by oxidizing a layer to be oxidized (not illustrated) including, for example, p-type $Al_{x9}Ga_{1-x9}As$, from a side surface of the mesa section 17. Thus, the current confining layer 148 has a function of confining electric current.

The buffer layer 149 is formed closer to the active layer 143 in relation to the current confining layer 148. The buffer layer 149 is formed adjacently to the current confining layer 148. As illustrated in FIG. 8, for example, the buffer layer 149 is formed in contact with a surface (lower surface) on a side of the active layer 143 of the current confining layer 148. It is to be noted that a thin layer having a thickness of, for example, about several nanometers may be provided between the current confining layer 148 and the buffer layer 149. The buffer layer 149 is provided, for example, within the upper DBR layer 145, in a part of a high refractive index layer which is several layers away from the current confining layer 148, for example, and is provided in place of the high refractive index layer.

The buffer layer 149 has an unoxidized region and an oxidized region (both not illustrated). The unoxidized region is formed mainly in a center region of the surface, and is formed, for example, in a part in contact with the current injection region 148A. The oxidized region is formed on the periphery of the unoxidized region 19A and has a ring shape. The oxidized region is formed mainly in an outer edge region of the surface, and is formed, for example, in a part in contact with the current confining region 148B. The oxidized region is formed in a biased manner on a side of the current confining layer 148 in a portion other than a portion corresponding to the outer edge of the buffer layer 149.

The unoxidized region includes a semiconductor material containing Al. Examples of the semiconductor material containing Al include p-type $Al_{x10}Ga_{1-x10}As$ $(0.85<x10 \leq 0.98)$ or p-type $InAl_{x11}GaAs$ $(0.85<x11 \leq 0.98)$. The oxidized region includes, for example, an aluminum oxide $(Al_2O_3)$, and is obtained by oxidizing a layer to be oxidized (not illustrated) including, for example, p-type $Al_{x10}Ga_{1-x10}As$ or p-type $InAl_{x11}GaAs$, from a side of a side surface of the mesa section 147 and a side of the layer to be oxidized. The layer to be oxidized of the buffer layer 149 includes a material and has a thicknesses in such a manner as to have an oxidation rate which is higher than that of the lower DBR layer 141 and that of the upper DBR layer 145, and is lower than that of the layer to be oxidized of the current confining layer 148.

An upper surface of the mesa section 147 (an upper surface of the contact layer 146) is provided with an upper electrode 151 having a ring shape. The upper electrode 151 has an opening (light exit window 151A) at least on a region opposed to the current injection region 148A. Further, an insulating layer (not illustrated) is formed on a front surface of the side surface and the periphery of the mesa section 147. In each of the light-emitting section groups X1 to X9 described above, the upper electrodes 151 are each coupled to the electrode pad 240 through a wiring line 111 illustrated in FIG. 7. In each of the light-emitting section groups Y1 to Y9 described above, the upper electrodes 151 are each coupled to the electrode pad 250 through a wiring line 112 illustrated in FIG. 7. The electrode pad 240 and the electrode pad 250 are coupled to respective electrodes provided on a front surface (the surface 21S1) of the holding section 21 to be described later by, for example, wire bonding, and are electrically coupled to the anode electrode 24 and the anode electrode 25, respectively, provided on a back surface (the surface 21S2) of the holding section 21. Another surface (back surface (surface 130S2) of the substrate 130 is provided with a lower electrode 152. The lower electrode 152 is electrically coupled to the cathode electrode 23 provided on, for example, the back surface (surface 21S2) of the holding section 21 to be described later. It is to be noted that, the present embodiment describes an example in which the cathode electrode is provided as a common electrode and the anode electrodes are provided individually; however, the anode electrodes may be provided as common electrodes and the cathode electrode may be provided individually, depending on a structure of the light-emitting element 11.

Here, the upper electrode 151, the electrode pads, and the coupling sections are configured by stacking, for example, titanium (Ti), platinum (Pt), and gold (Au) in this order, and are electrically coupled to the contact layer 146 on an upper portion of the mesa section 147. The lower electrode 152 has a structure in which, for example, an alloy of gold (Au) and germanium (Ge), nickel (Ni), and gold (Au) are stacked in this order from a side of the substrate 130, and is electrically connected to the substrate 130.

The microlens array 12 shapes beam shapes of the pieces of light (laser beams L110) to be outputted from the multiple light-emitting sections 110 for spot irradiation, beam shapes of the pieces of light (laser beams L120) to be outputted from the multiple light-emitting sections 120, or both the beam shapes of the laser beams L110 and the beam shapes of the laser beams L120, and outputs the laser beams L110 and the laser beams L120, for example. The microlens array 12 corresponds to a specific example of a "second optical member" according to the present disclosure. FIG. 9A schematically illustrates an example of a plane configuration of the microlens array 12, and FIG. 9B schematically illustrates a cross-sectional configuration of the microlens array 12 taken along a line I-I illustrated in FIG. 9A. The microlens array 12 includes multiple microlenses disposed in an array, and has multiple lens sections 12A and a parallel flat plate section 12B.

In the microlens array 12 according to the present embodiment, the lens sections 12A are disposed in such a manner as to be directly opposed to the multiple light-emitting sections 120 for uniform irradiation as illustrated in FIG. 10A, and the parallel flat plate section 12B is disposed in such a manner as to be directly opposed to the multiple light-emitting sections 110 for spot irradiation as illustrated in FIG. 10B. As a result, as illustrated in FIG. 11, the laser beams L120 outputted from the multiple light-emitting sections 120 are refracted by lens surfaces of the lens sections 12A to provide a virtual light-emitting point P2' in the microlens array 12, for example. That is, a light-emitting point P2 of the multiple light-emitting sections 120 located at the same height as a light-emitting point P1 of the multiple light-emitting sections 110 is shifted in an optical axis direction (for example, a Z-axis direction) of the light (laser beams L110 and laser beams L120) to be outputted from the multiple light-emitting sections 110 and the multiple light-emitting sections 120.

Accordingly, with switching of light emission between the multiple light-emitting sections 110 and the multiple light-emitting sections 120: the laser beams L110 outputted from the multiple light-emitting sections 110 form a spot-shaped irradiation pattern as illustrated in FIG. 3 or FIG. 12, for example; and the laser beams L120 outputted from the multiple light-emitting sections 120 form an irradiation pattern irradiated with light of a substantially uniform light intensity over a predetermined range, by overlapping portions of the laser beams L120 outputted from adjacent light-emitting sections 120 with each other as illustrated in FIG. 4 or FIG. 12, for example. The lighting device 1 is able to perform switching between the spot irradiation and the uniform irradiation, by performing switching of light emission between the multiple light-emitting sections 110 and the multiple light-emitting sections 120.

It is to be noted that FIG. 11 illustrates an example in which the microlens array 12 functions as a relay lens; however, the present disclosure is not limited thereto. For example, the virtual light-emitting point P2' of the multiple light-emitting sections 120 may be provided between the light-emitting section 120 and the microlens array 12.

The collimator lens 13 outputs the laser beams L110 outputted from the multiple light-emitting sections 110 and the laser beams L120 outputted from the multiple light-emitting sections 120 as substantially collimated light. The collimator lens 13 corresponds to a specific example of a "first optical member" according to the present disclosure.

The collimator lens 13 is, for example, a lens for collimating the laser beams L110 and the laser beams L120 outputted from the microlens array 12, and combining the laser beams L110 and the laser beams L120 with the diffractive element 14.

The diffractive element 14 divides and outputs each of the laser beams L110 outputted from the multiple light-emitting sections 110 and the laser beams L120 outputted from the multiple light-emitting sections 120. It is possible to use a diffractive optical element (DOE) as the diffractive element 14, for example. The diffractive optical element divides each of the laser beams L110 outputted from the multiple light-emitting sections 110 and the laser beams L120 outputted from the multiple light-emitting sections 120 into 3×3. Luminous fluxes of the laser beams L110 and the laser beams L120 are tiled by disposing the diffractive element 14, and this makes it possible to increase the number of spots based on a timing at which the spot irradiation is performed and to increase the irradiation range based on a timing at which the uniform irradiation is performed, for example.

The holding section 21 and the holding section 22 are for holding the light-emitting element 11, the microlens array 12, the collimator lens 13, and the diffractive element 14. Specifically, the holding section 21 holds the light-emitting element 11 in a concave section C provided in an upper surface (the surface 21S1) and holds the microlens array 12 along the surface 21S1. The holding section 22 holds the collimator lens 13 and the diffractive element 14. The microlens array 12 is held by the holding section 21 with an adhesive, for example, and the collimator lens 13 and the diffractive element 14 are each held by the holding section 22 with an adhesive, for example. The holding section 21 and the holding section 22 are coupled to each other in such a manner as to cause the light L1 (specifically, the laser beam L110) and the light L2 (specifically, the laser beam L120) outputted from the light-emitting element 11 to enter predetermined positions of the microlens array 12, and to cause the light L1 and the light L2 transmitted through the collimator lens 13 to be substantially collimated.

On the back surface (surface 21S2) of the holding section 21, multiple electrodes are provided. Specifically, the surface 21S2 of the holding section 21 is provided with: the cathode electrode 23 shared by the multiple light-emitting sections 110 for spot irradiation and the multiple light-emitting sections 120 for uniform irradiation; the anode electrode 24 for the multiple light-emitting sections 110 for spot irradiation; and the anode electrode 25 for the multiple light-emitting sections 120 for uniform irradiation.

It is to be noted that the configuration of the multiple electrodes provided on the surface 21S2 of the holding section 21 is not limited to the configuration described above. For example, a cathode electrode for the multiple light-emitting sections 110 for spot irradiation and a cathode electrode for the multiple light-emitting sections 120 for uniform irradiation may be provided individually, or an anode electrode may be provided as a common electrode for the multiple light-emitting sections 110 for spot irradiation and the multiple light-emitting sections 120 for uniform irradiation. Further, FIG. 1 illustrates an example in which the microlens array 12 is held by the holding section 21; however, the present disclosure is not limited thereto, and the microlens array 12 may be held by the holding section 22, for example. The collimator lens 13 and the diffractive element 14 may be held by the holding section 21.

1-2. Method of Driving Lighting Device

In the lighting device 1 according to the present embodiment, the light-emitting section group X including the multiple light-emitting sections 110 for spot irradiation and the light-emitting section group Y including the multiple light-emitting sections 120 for uniform irradiation provided on the light-emitting element 11 are driven independently of each other. The lighting device 1 is able to perform the spot irradiation and the uniform irradiation in one device, by performing switching of light emission between the light-emitting section group X and light-emitting section group Y. The spot irradiation is to irradiate the irradiation target object 1000 with mutually independent spot-shaped light beams (laser beams L110). The uniform irradiation is to irradiate a predetermined range with light beams of a substantially uniform light intensity (laser beams L120).

FIG. 13 illustrates an example of a configuration of a drive circuit of the lighting device 1. The switching between the light-emitting section group X and the light-emitting section group X2 is able to be achieved by, for example, an external switching switch using one driver 260.

The switching between the light-emitting section group X and the light-emitting section group X2 is also able be performed using two drivers 260A and 240B, for example, as illustrated in FIG. 14. The switching between the light-emitting section group X and the light-emitting section group X2 by using two drivers 260A and 240B makes it possible to individually control driving conditions including electric currents, voltages, and the like of the light-emitting section group X that performs the spot irradiation and the light-emitting section group Y that performs the uniform irradiation.

It is to be noted that the driver 260 may be provided outside the lighting device 1, for example, or may be built in the holding section 21, for example. Further, the light-emitting element 11 and the driver 260 may be directly coupled to each other.

FIG. 15 illustrates a light-emission sequence of the lighting device 1. The switching of light emission between the light-emitting section group X and the light-emitting section group Y may be performed, for example, on a per-frame basis or on a per-block basis. Alternatively, the switching of light emission between the light-emitting section group X and the light-emitting section group Y may be performed in units of multiple blocks. This makes it possible to perform switching between the spot irradiation and the uniform irradiation at a high speed as compared with, for example, a system in which a focal position of laser beams outputted from the multiple light-emitting sections is mechanically switched.

1-3. Configuration of Distance Measurement Apparatus

The distance measurement apparatus 100 illustrated in FIG. 2 measures a distance by the ToF method. The distance measurement apparatus 100 includes, for example, the lighting device 1, a light receiver 210, a controller 220, and a distance measurement section 230.

As described above, the lighting device 1 irradiates the irradiation target object 1000 with spot-shaped light beams (spot irradiation) and with light beams of a substantially uniform light intensity (uniform irradiation), by performing switching of light emission between the multiple light-emitting sections 110 and the multiple light-emitting sections 120. The lighting device 1 generates, for example, irradiation light in synchronization with a light-emission control signal CLKp of a rectangular wave. Further, the light-emission control signal CLKp is not limited to the rectangular wave as long as it is a periodic signal. For example, the light-emission control signal CLKp may be a sine wave.

The light receiver 210 receives light reflected from the irradiation target object 1000, and detects, every time a period of a vertical synchronization signal VSYNC elapses, a received light amount within the period. For example, a periodic signal of 60 hertz (Hz) is used as the vertical synchronization signal VSYNC. Further, in the light receiver 210, multiple pixel circuits are disposed in a two-dimensional lattice shape. The light receiver 210 supplies image data (a frame) corresponding to the received light amount of the pixel circuits to the distance measurement section 230. It is to be noted that a frequency of the vertical synchronization signal VSYNC is not limited to 60 hertz (Hz), may be 30 hertz (Hz) or 120 hertz (Hz).

The controller 220 controls the lighting device 1. The controller 220 generates the light-emission control signal CLKp and supplies the lighting device 1 and the light receiver 210 with the light-emission control signal CLKp. A frequency of the light-emission control signal CLKp is, for example, 20 megahertz (MHz). It is to be noted that the frequency of the light-emission control signal CLKp is not limited to 20 megahertz (MHz), and may be 5 megahertz (MHz), for example.

The distance measurement section 230 measures a distance to the irradiation target object 1000 by the ToF method on the basis of the image data. The distance measurement section 230 measures a distance for each pixel circuit and generates a depth map which indicates a distance to an object for each pixel by a gradation value. This depth map is used, for example, for image processing in which blurring processing with a degree corresponding to a distance is performed, auto focus (AF) processing in which a focused focal point of a focus lens is determined according to a distance, or the like.

1-4. Workings and Effects

In the lighting device 1 according to the present embodiment, the microlens array 12 is disposed on the optical path of the light L1 (laser beams L110) and the light L2 (laser beams L120). The microlens array 12 shapes, for example, the beam shapes of the laser beams L120 for uniform irradiation and outputs the laser beams. The laser beams L110 and the laser beams L120 are to be outputted from the light-emitting element 11 including the multiple light-emitting sections (the multiple light-emitting sections 110 and the multiple light-emitting sections 120) that configures the light-emitting section groups X for spot irradiation and the light-emitting section groups Y for uniform irradiation. This makes it possible to shift, in the optical axis direction, the respective light-emitting point positions of the laser beams L110 and the laser beams L120 to be outputted from the multiple light-emitting sections 110 and the multiple light-emitting sections 120, respectively. This will be described below.

As described above, the distance measurement apparatus that uses the ToF method performs: a method of uniformly applying pieces of light outputted from the multiple light-emitting sections on an entire surface of a measurement target range; and a method of causing pieces of light outputted from the multiple light-emitting sections to be substantially collimated by the collimator lens, and applying the pieces of spot-shaped light outputted on the entire surface of the measurement target range.

A distance measurement apparatus including two light sources, i.e., a light source for uniform irradiation and a light source for spot irradiation, has generally been used as a technique that reduces a distance measurement error due to light scattered by a measurement object. However, in addition thereto, the distance measurement apparatus including two light sources, i.e., the light source for uniform irradiation and the light source for spot irradiation, is able to compensate reduction in XY resolution by the uniform irradiation while increasing a distance measurement distance by increasing light density by the spot irradiation.

Thus, the use of two light sources having differing irradiation patterns is an effective technique for increasing the distance measurement accuracy; however, there are issues that cost may increase and a size of the apparatus may increase due to the use of two light sources. In addition, there are also issues that adjustment of relative positions of the two light sources may be necessary in manufacturing the distance measurement apparatus, and positional deviation may occur due to temporal change.

In this regard, in the present embodiment, the microlens array 12 is disposed on the optical path of the laser beams L110 and the laser beams L120 to be outputted from the light-emitting element 11 including the multiple light-emitting sections 110 for spot irradiation and the multiple light-emitting sections 120 for uniform irradiation. The microlens array 12 has the lens sections 12A and the parallel flat plate section 12B, and is disposed, for example, in such a manner that the laser beams L110 outputted from the multiple light-emitting sections 110 enter the parallel flat plate section 12B and the laser beams L120 outputted from the multiple light-emitting sections 120 enter the lens sections 12A. As a result, the laser beams L120 that have entered the lens section 12A are refracted by the lens surface of the lens section 12A to change the beam shape, and the virtual light-emitting point P2' is provided in microlens array 12, for example. This makes it possible to cause the position of the light-emitting point P1 of the multiple light-emitting sections 110 to be different in the optical axis direction from the position of the light-emitting point P2 of the multiple light-emitting sections 120.

As described above, the lighting device 1 according to the present embodiment makes it possible to perform the spot irradiation and the uniform irradiation on the irradiation target object 1000 without using, for example, an adjusting mechanism that mechanically adjusts a position of an optical member (e.g., the collimator lens 13) disposed in an outputting direction of the multiple light-emitting sections 110 for spot irradiation and the multiple light-emitting sections 120 for uniform irradiation in accordance with each irradiation mode. Therefore, it is possible to achieve downsizing of the lighting device 1 and the distance measurement apparatus 100 including the same.

Further, the present embodiment does not necessitate the above-described adjusting mechanism; thus, it is possible to reduce cost. Still further, positional deviation or the like of the optical member due to temporal change does not occur; thus, it is possible to improve reliability. Moreover, in the present embodiment, it is possible to switch the irradiation modes at a high speed, which makes it possible to accurately measure a distance of a moving object.

In addition, as compared with a case where a lighting device for spot irradiation and a lighting device for uniform irradiation are separately provided, the present embodiment uses the surface-emitting semiconductor laser including the multiple light-emitting sections is used as a light source, and some of the light-emitting sections are used as the multiple light-emitting sections 110 for spot irradiation, and the remaining light-emitting sections are used as the multiple light-emitting sections 120 for uniform irradiation. As a result, it is possible to perform switching optionally between the spot irradiation and the uniform irradiation for the irradiation target object 1000, by performing switching of light emission between the light-emitting section group X including the multiple light-emitting sections 110 and the light-emitting section group Y including the multiple light-emitting sections 120. Accordingly, it is possible to further reduce the cost.

Further, it is not necessary to adjust the relative positions of the light source for spot irradiation and the light source for uniform irradiation as described above, for example. This makes it possible to provide a lighting device that is able to perform the spot irradiation and the uniform irradiation more easily.

Furthermore, in the present embodiment, the light-emission areas (OA diameters W3 and W4) of the multiple light-emitting sections 110 for spot irradiation and the multiple light-emitting sections 120 for uniform irradiation are set in such a manner that the OA diameters W3 of the multiple light-emitting sections 110 for spot irradiation are relatively small and the OA diameters W4 of the multiple light-emitting sections 120 for uniform irradiation are relatively large. This makes it possible to further condense the laser beams L110 for spot irradiation. In addition, it is possible to improve uniformity of light intensity and optical power based on a timing at which the uniform irradiation is performed.

Next, modification examples 1 to 6 according to the present disclosure will be described. Hereinafter, similar components to those of the embodiment described above are denoted by the same reference numerals, and description thereof is omitted as appropriate.

2. Modification Example

2-1. Modification Example 1

FIG. 16 illustrates a beam shaping function of the microlens array 12 according to a modification example 1 of the present disclosure. The embodiment described above illustrates the example in which the lens sections 12A are disposed in such a manner as to be directly opposed to the multiple light-emitting sections 120 for uniform irradiation and the parallel flat plate section 12B is disposed in such a manner as to be directly opposed to the multiple light-emitting sections 110 for spot irradiation; however, the present disclosure is not limited thereto. The lens sections 12A may be disposed in such a manner as to be directly opposed to the multiple light-emitting sections 110 for spot irradiation and the parallel flat plate section 12B may be disposed in such a manner as to be directly opposed to the multiple light-emitting sections 120 for uniform irradiation. Also with such a configuration, it is possible to obtain similar effects as in the above-described embodiment.

2-2. Modification Example 2

FIG. 17A schematically illustrates an example of a plane configuration of the microlens array 12 according to a modification example 2 of the present disclosure, and FIG. 17B schematically illustrates a cross-sectional configuration of the microlens array 12 taken along a line II-II illustrated in FIG. 17A. The microlens array 12 illustrated in FIG. 17A and FIG. 17B has two types of microlenses whose curvature radii are different from each other disposed in an array. The microlens array 12 includes multiple lens sections 12A and multiple lens sections 12C, and the curvature radii are different between the multiple lens sections 12A and the multiple lens sections 12C.

In the above-described embodiment and the like, the configuration is described in which the laser beams L110 outputted from the multiple light-emitting sections 110 or the laser beams L120 outputted from the multiple light-emitting sections 120 enter the lens sections 12A and the other of the laser beams L110 and the laser beams L120 enter the parallel flat plate section 12B; however, the present disclosure is not limited thereto.

For example, as illustrated in FIG. 18, for example, the multiple light-emitting sections 120 for uniform irradiation may be disposed in such a manner as to be directly opposed to the lens sections 12A and the multiple light-emitting sections 110 for spot irradiation may be disposed in such a manner as to be directly opposed to the lens sections 12C. Thus, the laser beams L110 and laser beams L120 outputted from the multiple light-emitting sections 110 and the multiple light-emitting sections 120 may enter the lens sections 12C and the lens sections 12A, respectively.

As a result, as illustrated in FIG. 18, the laser beams L120 outputted from the multiple light-emitting sections 120 are refracted by lens surfaces of the lens sections 12A to provide the virtual light-emitting point P2' in the microlens array 12, for example. The laser beams L110 outputted from the multiple light-emitting sections 110 are refracted by lens surfaces of the lens sections 12C to provide a virtual light-emitting point P1' behind the multiple light-emitting sections 110, for example.

As described above, the present modification example uses the microlens array 12 having two types of lens sections (the lens sections 12A and the lens sections 12C) whose curvature radii are different from each other, and causes the laser beams L110 to be outputted from the multiple light-emitting sections 110 for spot irradiation and the laser beams L120 to be outputted from the multiple light-emitting sections 120 for uniform irradiation to enter the lens sections, thereby shaping beam shapes of both the laser beams L110 and the laser beams L120. As a result, in addition to the effects of the above embodiment, it is possible to cause the respective positions of the light-emitting points (virtual light-emitting points P1' and P2') to differ from each other more greatly in the optical axis direction.

In addition, by causing the respective positions of the virtual light-emitting points P1' and P2' of the multiple light-emitting sections 110 and the multiple light-emitting sections 120 to differ from each other more greatly in the optical axis direction in this manner, it becomes easy to dispose the microlens array 12 at a position in front of a position where the laser beams L110 and L120 to be outputted from the multiple light-emitting sections 110 and 120 overlap with each other. This makes it easy to effectively utilize the laser beams L110 and L120, and to further improve the uniformity of the light intensity based on the timing at which the uniform irradiation is performed.

2-3. Modification Example 3

FIG. 19 is a schematic cross-sectional view of an example of a schematic configuration of a lighting device (lighting device 1A) according to a modification example 3 of the present disclosure. The lighting device 1A according to the present modification example differs from the above-described embodiment in that a diffractive optical element (DOE) 32 is used as the second optical member.

The diffractive optical element 32 shapes beam shapes of the pieces of light (laser beams L110) to be outputted from the multiple light-emitting sections 110 for spot irradiation, beam shapes of the pieces of light (laser beams L120) to be outputted from the multiple light-emitting sections 120, or both the beam shapes of the laser beams L110 and the beam shapes of the laser beams L120, and outputs the laser beams L110 and the laser beams L120, for example. FIG. 20 schematically illustrates an example of a plane configuration of the diffractive optical element 32, in which, for example, the multiple light-emitting sections 120 for uniform irradiation are disposed in such a manner as to be directly opposed to regions 32A and the multiple light-emitting sections 110 for spot irradiation are disposed in such a manner as to be directly opposed to regions 32B.

As the diffractive optical element 32, for example, a Fresnel lens having a plane pattern as illustrated in FIG. 21 and a cross-sectional pattern as illustrated in FIG. 22 may be used in the region 32A. It is to be noted that the region 32B is, for example, a parallel-plate region. In a case where the Fresnel lens is used as the diffractive optical element 32, the laser beams L120 outputted from the multiple light-emitting sections 120 may form, for example, an irradiation pattern as illustrated in FIG. 23 on the irradiation target object 1000.

Further, as the diffractive optical element 32, for example, a binary lens having a cross-sectional pattern as illustrated in FIG. 24 may be used in the region 32A. In a case where the binary lens is used as the diffractive optical element 32, the laser beams L120 outputted from the multiple light-emitting sections 120 may form, for example, an irradiation pattern as illustrated in FIG. 25 by pieces of +1st order light and pieces of −1st order light being overlapped with each other.

Moreover, as the diffractive optical element 32, for example, a DOE corresponding to a saddle lens having a plane pattern as illustrated in FIG. 26A may be used in the region 32A. In the DOE, the plane patterns illustrated in FIG. 26A are disposed in such a manner as to be rotated by 45° in an adjacent region, as illustrated in FIG. 26B. Using such a DOE as the diffractive optical element 32, the laser beams L120 outputted from the multiple light-emitting sections 120 form an irradiation pattern as illustrated in FIG. 27, for example. This makes it possible to improve reduction in uniformity with respect to deviation in the optical axis direction.

As described above, in the present modification example, the diffractive optical element 32 such as the Fresnel lens is used as the second optical member of the present disclosure. As a result, it is possible to further improve the uniformity of the light intensity based on the timing at which the uniform irradiation is performed, as compared with the case where the microlens array 12 is used as the second optical member of the present disclosure and shapes, for example, the beam shapes of the laser beams L120 outputted from the multiple light-emitting sections 120 for uniform irradiation by refracting the laser beams L120, as in the above-described embodiment.

It is to be noted that, in addition to the microlens array 12 and the diffractive optical element 32 such as the Fresnel lens described above, a diffuser may be used as the second optical member according to the present disclosure. In a case where the diffuser is used as the second optical member, expected positional accuracy is relaxed and it is possible to reduce the cost, as compared with the case of using the microlens array 12 or the diffractive optical element 32.

2-4. Modification Example 4

FIG. 28 is a schematic cross-sectional view of an example of a schematic configuration of a lighting device (lighting device 1B) according to a modification example 4 of the present disclosure. The lighting device 1B according to the present modification example differs from the above-described embodiment in that the diffractive element 14 and a diffractive element 34 are disposed in the optical path of the laser beams L110 and the laser beams L120 outputted from the multiple light-emitting sections 110 and the multiple light-emitting sections 120, respectively, for example, in a subsequent stage of the collimator lens 13.

The diffractive element 34 divides and outputs the laser beams L110 outputted from the multiple light-emitting sections 110 and the laser beams L120 outputted from the multiple light-emitting sections 120. The diffractive element 34 is, for example, a simple diffraction grating in which a number of parallel slits are provided at equal intervals. The diffractive element 34 corresponds to a specific example of a "third optical member" according to the present disclosure.

FIG. 29A illustrates an irradiation pattern of the laser beams L110 for spot irradiation outputted from the multiple light-emitting sections 110 on the irradiation target object 1000, in a case where the diffractive element 34 is not disposed. FIG. 29A further illustrates an irradiation pattern of the laser beams L120 whose beam shapes are unprocessed, where the irradiation pattern of the laser beams L110 is represented by a solid line and the irradiation pattern of the laser beams L120 is represented by a dotted line. FIG. 29B illustrates an irradiation pattern of the laser beams L110 outputted from the multiple light-emitting sections 110 to be applied on the irradiation target object 1000, in a case where the diffractive element 34 is disposed.

As illustrated in FIG. 29B, disposing the diffractive element 34 causes the spot irradiation to be performed in such a manner that: pieces of 0th order light (110X₀) out of the laser beams L110 transmitted through the diffractive element 34 are applied on irradiation positions of the laser beams L110 of the case where the diffractive element 34 is not disposed; and pieces of +1st order light (110X₊₁) and pieces of −1st order light (110X₋₁) are applied on irradiation positions of the laser beams L120 whose beam shapes are unprocessed, for example. That is, disposing the diffractive element 34 makes it possible to further increase the number of light spots to be applied on the irradiation target object 1000. Further, the laser beams L120 for uniform irradiation to be outputted from the multiple light-emitting sections 120 are also diffracted in the similar manner as the laser beams L110 for spot irradiation, which makes it possible to further improve the uniformity of the light intensity based on the timing at which the uniform irradiation is performed owing to the overlapping of the pieces of diffracted light.

As described above, in the present modification example, the diffractive element 34 is further disposed on the optical path of the laser beams L1110 and the laser beams L120 outputted from the multiple light-emitting sections 110 and the multiple light-emitting sections 120, respectively. This makes it possible to perform the spot irradiation and the uniform irradiation with high optical density on the irradiation target object 1000, as compared with the above-described embodiment and the like. In other words, the spot irradiation enables measurement of a distance to a farther object with high accuracy. The uniform irradiation enables measurement of a distance to a closer object with higher resolution.

It is to be noted that, the present modification example illustrates the example in which the diffraction element 14 and the diffractive element 34 are configured as separate components; however, a diffractive optical surface may be provided on each of both sides of one optical element. Further, FIG. 28 illustrates the example in which the diffractive element 34 is disposed in the subsequent stage of the collimator lens 13; however, the position at which the diffractive element 34 is disposed not limited thereto, and may be disposed between the microlens array 12 and the collimator lens 13, for example.

Further, the present modification example illustrates the example in which the simple diffraction grating is used as the diffractive element 34: however, a diffractive optical element (DOE) having a more complicated diffraction pattern may be used, for example. Still further, the diffractive element 34 may be integrated with the microlens array 12, for example. In this case, effects may be applied only to the laser beams L110 for spot irradiation or only to the laser beams L120 for uniform irradiation, for example. Further, the laser beams L110 for spot irradiation and the laser beams L120 for uniform irradiation may form diffraction patterns that are different from each other.

2-5. Modification Example 5

FIG. 30 is a schematic cross-sectional view of an example of a schematic configuration of a lighting device (lighting device 1C) according to a modification example 5 of the present disclosure. The lighting device 1C according to the present modification example differs from the above-described embodiment in that a back side output type surface-emitting semiconductor laser is used as a light-emitting element 31.

FIG. 31 illustrates an example of a cross-sectional configuration of the light-emitting element 31 in the lighting device 1C and a positional relationship with the microlens array 12. As described above, the light-emitting element 31 is the back side output type surface-emitting semiconductor laser, and has multiple light-emitting sections 310 and 320 for spot irradiation and uniform irradiation formed in an array on the back surface (surface 130S2) side of the substrate 130. Moreover, the surface 130S2 of the substrate 130 is further provided with an electrode pad 340 for applying voltage to the multiple light-emitting sections 310 and an electrode pad 350 for applying voltage to the multiple light-emitting sections 320. Except for those points, the light-emitting element 31 has a similar configuration as the light-emitting element 11 described above.

Thus, not only the front side irradiation type surface-emitting semiconductor laser but also the back side irradiation type surface-emitting semiconductor laser may be used in the lighting device according to the present disclosure. Using the back side irradiation type surface-emitting semiconductor laser as the light-emitting element 31 makes it possible to reduce regions of the multiple electrode pads. Further, it is possible to perform the switching between the spot irradiation and the uniform irradiation easily, as compared with the above-described embodiment.

Further, in a case where the back side output type surface-emitting semiconductor laser is used as the light-emitting element 31 as in the present modification example, it is possible to form the second optical member and the light-emitting element 31 in an integrated manner. Specifically, as illustrated in FIG. 32, for example, microlenses 42 are disposed at positions directly opposed to the multiple light-emitting sections 320 for uniform irradiation, for example, on the front surface (surface 130S1) of the substrate 130 of the light-emitting element 31. This makes it possible to dispose the second optical member with higher positional accuracy. Further, it is possible to reduce the cost as compared with a case where the optical member such as a microlens array 12 is separately disposed.

It is to be noted that FIG. 32 illustrates the example in which the microlens 42 is disposed as the second optical member; however, the present disclosure is not limited thereto, and a diffractive optical element such as the Fresnel lens, or a diffuser may be disposed.

2-6. Modification Example 6

FIG. 33 schematically illustrates another example of a cross-sectional configuration of the light-emitting element 11 according to a modification example 6 of the present disclosure. In the above-described embodiment, the example in which the light-emitting element 11 having the multiple light-emitting sections 110 for spot irradiation and the multiple light-emitting sections 120 for uniform irradiation on the same plane is used. However, the multiple light-emitting sections 110 and the multiple light-emitting sections 120 may be formed on different planes.

Specifically, for example, as in a light-emitting element 11A illustrated in FIG. 33, the multiple light-emitting sections 110 and the multiple light-emitting sections 120 may be provided on the front surface (surface 130S1) of the substrate 130, in such a manner that the multiple light-emitting sections 110 are different from the multiple light-emitting sections 120 in height. The height is determined with respect to the optical axis direction (for example, the Z-axis direction) of the laser beams L110 and the laser beams L120 to be outputted from the multiple light-emitting sections 110 and the multiple light-emitting sections 120, respectively.

Further, for example, as in a light-emitting element 11B illustrated in FIG. 34, the multiple light-emitting sections 110 or the multiple light-emitting sections 120 (for example, the multiple light-emitting sections 110) may be provided on the front surface (surface 130S1) side of the substrate 130, and the other (for example, the multiple light-emitting sections 120) may be provided on the back surface (surface 130S2) side of the substrate 130. In other words, out of the multiple light-emitting sections for spot irradiation and the multiple light-emitting sections for uniform irradiation, the multiple light-emitting sections of one type may use the front side output type surface-emitting semiconductor laser, and the multiple light-emitting sections of the other type may use the back side output type surface-emitting semiconductor laser.

Further, for example, as in a light-emitting element 11C illustrated in FIG. 35, for example, a light-emitting element 11Ca having the multiple light-emitting sections 110 for spot irradiation and a light-emitting element 11Cb having the multiple light-emitting sections 120 for uniform irradiation may be provided, and may be used by stacking them.

In this manner, providing steps in the light-emitting element 11 between the multiple light-emitting sections 110 for spot irradiation and the multiple light-emitting sections 120 for uniform irradiation makes it possible to further improve the uniformity of the light intensity at the timing at which the uniform irradiation is performed, without separately disposing the diffractive element 34 as in the above-described modification example 4, for example.

Although the disclosure is described hereinabove with reference to the example embodiments and modification examples 1 to 6, these embodiments and modification examples are not to be construed as limiting the scope of the disclosure and may be modified in a wide variety of ways. For example, the above-described modification examples 1 to 6 may be combined with each other, and for example, the back side output type surface-emitting laser and the diffractive optical element 32 such as the Fresnel lens may be combined with each other. Further, FIG. 21 and FIG. 26 illustrate the DOE (diffractive optical element 32) having a period greater than the wavelength; however, a structure smaller than the wavelength may be provided with a beam shaping function using a so-called metamaterial.

It should be appreciated that the effects of an example embodiment and modification examples of the disclosure are not limited to those described herein. The disclosure may further include any effects other than those described herein.

It is to be noted that the present disclosure may have the following configurations. According to the present technology having the following configurations, a second optical member is disposed which: shapes beam shapes of, out of pieces of light (multiple pieces of first light and multiple pieces of second light) to be outputted from a light-emitting element having multiple first light-emitting sections and multiple second light-emitting sections, the multiple pieces of first light, the multiple pieces of second light, or both; and outputs the pieces of light. This makes it possible to change positions of light-emitting points of the multiple pieces of first light and the multiple pieces of second light. Therefore, it is possible to achieve downsizing of a lighting device and a distance measurement apparatus including the same.

(1)

A lighting device including:

a light-emitting element having multiple first light-emitting sections and multiple second light-emitting sections;

a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light; and a second optical member that shapes beam shapes of the multiple pieces of first light, beam shapes of the multiple pieces of second light, or both the beam shapes of the multiple pieces of first light and the beam shapes of the multiple pieces of second light, and outputs the multiple pieces of first light and the multiple pieces of second light in a manner that the beam shapes are different between the multiple pieces of first light and the multiple pieces of second light.

(2)

The lighting device according to (1), in which the multiple pieces of first light outputted from the multiple first light-emitting sections are applied on an irradiation target object in mutually independent spot shapes, and the multiple pieces of second light outputted from the multiple second light-emitting sections are applied on the irradiation target object in a manner that portions of pieces of second light outputted from adjacent second light-emitting sections overlap with each other, and a predetermined range is irradiated substantially uniformly with the multiple pieces of second light.

(3)

The lighting device according to (1) or (2), in which a light-emission areas are different between the multiple first light-emitting sections and the multiple second light-emitting sections.

(4)

The lighting device according to (2) or (3), in which the multiple first light-emitting sections are smaller in light-emission area than the multiple second light-emitting sections.

(5)

The lighting device according to any one of (1) to (4), in which the first optical member includes a collimator lens.

(6)

The lighting device according to any one of (1) to (5), in which the second optical member includes a microlens array.

(7)

The lighting device according to (6), in which the microlens array includes two types of lenses whose curvature radii are different from each other.

(8)

The lighting device according to any one of (1) to (5), in which the second optical member includes a diffractive optical element.

(9)

The lighting device according to (8), in which the diffractive optical element includes a Fresnel lens or a binary lens.

(10)

The lighting device according to any one of (1) to (9), further including a driver that independently drives the multiple first light-emitting sections and the multiple second light-emitting sections.

(11)

The lighting device according to any one of (2) to (10), further including a third optical member that is disposed on an optical path of the multiple pieces of first light and the multiple pieces of second light, refracts or diffracts the multiple pieces of first light to increase a number of spots to be applied on the irradiation target object, and refracts or diffracts the multiple pieces of second light to increase a range in which the pieces of second light outputted from the adjacent second light-emitting sections overlap with each other.

(12)

The lighting device according to any one of (1) to (11), in which, in the light-emitting element, the multiple first light-emitting sections and the multiple second light-emitting sections are disposed in an array, and the multiple first light-emitting sections and the multiple second light-emitting sections are alternately disposed.

(13)

The lighting device according to any one of (1) to (12), in which the multiple first light-emitting sections and the multiple second light-emitting sections respectively output the multiple pieces of first light and the multiple pieces of second light in a substantially vertical direction with respect to one surface of a substrate, and the multiple first light-emitting sections and the multiple second light-emitting sections are formed in a manner that the multiple first light-emitting sections are different from the multiple second light-emitting sections in height.

(14)

The lighting device according to (13), in which the multiple first light-emitting sections and the multiple second light-emitting sections are each formed on the one surface of the substrate.

(15)

The lighting device according to (13), in which the multiple first light-emitting sections or the multiple second light-emitting sections are formed on the one surface of the substrate, and the other of the multiple first light-emitting sections and the multiple second light-emitting sections are formed on another surface that is opposed to the one surface of the substrate.

(16)

The lighting device according to any one of (1) to (15), in which the multiple first light-emitting sections are formed on a first substrate, and the multiple second light-emitting sections are formed on a second substrate, and the first substrate and the second substrate are stacked on each other.

(17)

The lighting device according to any one of (1) to (16), in which the multiple first light-emitting sections and the multiple second light-emitting sections are each provided on one surface of a substrate, and respectively outputs the multiple pieces of first light and the multiple pieces of second light from another surface that is opposed to the one surface of the substrate, and the second optical member is provided on the other surface of the substrate.

(18)

The lighting device according to any one of (1) to (17), in which the light-emitting element includes a back side output type surface-emitting laser.

(19)

A lighting device including:

a light-emitting element having multiple first light-emitting sections and multiple second light-emitting sections;

a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light;

a second optical member that shapes beam shapes of the multiple pieces of second light outputted from the multiple second light-emitting sections, and outputs the multiple pieces of second light; and a driver that independently control the first light-emitting section and the second light-emitting section to be switched between a lighting-on state and a lighting-off state, in which the lighting device applies each of the multiple pieces of first light on a target as a spot-shaped light beam, and applies the multiple pieces of second light on the target as substantially uniform light beams.

(20)

A distance measurement apparatus including:

a lighting device that outputs light to an object;

a light receiver that detects reflected light from the object; and

a distance measurement section that measures a distance to the object on a basis of time taken for receiving the reflected light, in which the lighting device includes a light-emitting element having multiple first light-emitting sections and multiple second light-emitting sections, a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light, and a second optical member that shapes beam shapes of the multiple pieces of first light, beam shapes of the multiple pieces of second light, or both the beam shapes of the multiple pieces of first light and the beam shapes of the multiple pieces of second light, and outputs the multiple pieces of first light and the multiple pieces of second light in a manner that the beam shapes are different between the multiple pieces of first light and the multiple pieces of second light.

This application claims the benefit of Japanese Priority Patent Application JP2019-188724 filed with the Japan Patent Office on Oct. 15, 2019, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof

The invention claimed is:

1. A lighting device comprising:

a light-emitting element including, within the light-emitting element, multiple first light-emitting sections and multiple second light-emitting sections;

a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light; and a second optical member that shapes beam shapes of the multiple pieces of first light, beam shapes of the multiple pieces of second light, or both the beam shapes of the multiple pieces of first light and the beam shapes of the multiple pieces of second light, and outputs the multiple pieces of first light and the multiple pieces of second light in a manner that the beam shapes are different between the multiple pieces of first light and the multiple pieces of second light, wherein the lighting device is configured with the first optical member mechanically fixed with respect to the second optical member, which is a passive element.

2. The lighting device according to claim 1, wherein the multiple pieces of first light outputted from the multiple first light-emitting sections are applied on an irradiation target object in mutually independent spot shapes, and the multiple pieces of second light outputted from the multiple second light-emitting sections are applied on the irradiation target object in a manner that portions of pieces of second light outputted from adjacent second light-emitting sections overlap with each other, and a predetermined range is irradiated substantially uniformly with the multiple pieces of second light.

3. The lighting device according to claim 1, wherein light-emission areas are different between the multiple first light-emitting sections and the multiple second light-emitting sections.

4. The lighting device according to claim 2, wherein the multiple first light-emitting sections are smaller in light-emission area than the multiple second light-emitting sections.

5. The lighting device according to claim 1, wherein the first optical member comprises a collimator lens.

6. The lighting device according to claim 1, wherein the second optical member comprises a microlens array.

7. The lighting device according to claim 6, wherein the microlens array includes two types of lenses whose curvature radii are different from each other.

8. The lighting device according to claim 1, wherein the second optical member comprises a diffractive optical element.

9. The lighting device according to claim 8, wherein the diffractive optical element comprises a Fresnel lens or a binary lens.

10. The lighting device according to claim 1, further comprising a driver that independently drives the multiple first light-emitting sections and the multiple second light-emitting sections.

11. The lighting device according to claim 2, further comprising a third optical member that is disposed on an optical path of the multiple pieces of first light and the multiple pieces of second light, refracts or diffracts the multiple pieces of first light to increase a number of spots to be applied on the irradiation target object, and refracts or diffracts the multiple pieces of second light to increase a range in which the pieces of second light outputted from the adjacent second light-emitting sections overlap with each other.

12. The lighting device according to claim 1, wherein, in the light-emitting element, the multiple first light-emitting sections and the multiple second light-emitting sections are disposed in an array, and the multiple first light-emitting sections and the multiple second light-emitting sections are alternately disposed.

13. The lighting device according to claim 1, wherein the multiple first light-emitting sections and the multiple second light-emitting sections respectively output the multiple pieces of first light and the multiple pieces of second light in a substantially vertical direction with respect to one surface of a substrate, and the multiple first light-emitting sections and the multiple second light-emitting sections are formed in a manner that the multiple first light-emitting sections are different from the multiple second light-emitting sections in height.

14. The lighting device according to claim 13, wherein the multiple first light-emitting sections and the multiple second light-emitting sections are each formed on the one surface of the substrate.

15. The lighting device according to claim 13, wherein the multiple first light-emitting sections or the multiple second light-emitting sections are formed on the one surface of the substrate, and the other of the multiple first light-emitting sections and the multiple second light-emitting sections are formed on another surface that is opposed to the one surface of the substrate.

16. The lighting device according to claim 1, wherein the multiple first light-emitting sections are formed on a first substrate, and the multiple second light-emitting sections are formed on a second substrate, and the first substrate and the second substrate are stacked on each other.

17. The lighting device according to claim 1, wherein the multiple first light-emitting sections and the multiple second light-emitting sections are each provided on one surface of a substrate, and respectively outputs the multiple pieces of first light and the multiple pieces of second light from another surface that is opposed to the one surface of the substrate, and the second optical member is provided on the other surface of the substrate.

18. The lighting device according to claim 1, wherein the light-emitting element comprises a back side output type surface-emitting laser.

19. A lighting device comprising:

a light-emitting element including, within the light-emitting element, multiple first light-emitting sections and multiple second light-emitting sections;

a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light;

a second optical member that shapes beam shapes of the multiple pieces of second light outputted from the multiple second light-emitting sections, and outputs the multiple pieces of second light; and a driver that independently control the first light-emitting section and the second light-emitting section to be switched between a lighting-on state and a lighting-off state, wherein the lighting device applies each of the multiple pieces of first light on a target as a spot-shaped light beam, and applies the multiple pieces of second light on the target as substantially uniform light beams, wherein the lighting device is configured with the first optical member mechanically fixed with respect to the second optical member, which is a passive element.

20. A distance measurement apparatus comprising:

a lighting device that outputs light to an object;

a light receiver that detects reflected light from the object; and a distance measurement section that measures a distance to the object on a basis of time taken for receiving the reflected light, wherein the lighting device includes a light-emitting element including, within the light-emitting element, multiple first light-emitting sections and multiple second light-emitting sections, a first optical member that causes multiple pieces of first light outputted from the multiple first light-emitting sections and multiple pieces of second light outputted from the multiple second light-emitting sections to be substantially collimated, and outputs the multiple pieces of first light and the multiple pieces of second light, and a second optical member that shapes beam shapes of the multiple pieces of first light, beam shapes of the multiple pieces of second light, or both the beam shapes of the multiple pieces of first light and the beam shapes of the multiple pieces of second light, and outputs the multiple pieces of first light and the multiple pieces of second light in a manner that the beam shapes are different between the multiple pieces of first light and the multiple pieces of second light, wherein the lighting device is configured with the first optical member mechanically fixed with respect to the second optical member, which is a passive element.

* * * * *